(12) United States Patent
Fiske et al.

(10) Patent No.: US 9,703,500 B2
(45) Date of Patent: Jul. 11, 2017

(54) REDUCING POWER CONSUMPTION BY MIGRATION OF DATA WITHIN A TIERED STORAGE SYSTEM

(75) Inventors: Rahul M. Fiske, Pune (IN); Carl E. Jones, Tucson, AZ (US); Subhojit Roy, Pune (IN); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/455,183

(22) Filed: Apr. 25, 2012

(65) Prior Publication Data
US 2013/0290598 A1 Oct. 31, 2013

(51) Int. Cl.
*G06F 12/00* (2006.01)
*G06F 3/06* (2006.01)

(52) U.S. Cl.
CPC ............ *G06F 3/0625* (2013.01); *G06F 3/068* (2013.01); *G06F 3/0649* (2013.01); *Y02B 60/1246* (2013.01)

(58) Field of Classification Search
CPC .... G06F 3/0625; G06F 3/0649; G06F 3/0647; G06F 3/0655
USPC ........................................................ 711/117
See application file for complete search history.

(56) References Cited

U.S. PATENT DOCUMENTS

| | | |
|---|---|---|
| 5,506,986 A | 4/1996 | Healy |
| 5,671,388 A | 9/1997 | Hasbun |
| 5,813,000 A | 9/1998 | Furlani |
| 5,893,139 A | 4/1999 | Kamiyama |
| 6,339,793 B1 | 1/2002 | Bostian et al. |
| 6,487,638 B2 | 11/2002 | Dawkins et al. |
| 7,062,624 B2 | 6/2006 | Kano |
| 7,093,149 B2 | 8/2006 | Tsirkel et al. |
| 7,155,593 B2 | 12/2006 | Kano |

(Continued)

FOREIGN PATENT DOCUMENTS

| | | |
|---|---|---|
| CN | 102360273 A | 2/2012 |
| CN | 202362772 U | 8/2012 |

(Continued)

OTHER PUBLICATIONS

U.S. Appl. No. 12/498,424.

(Continued)

*Primary Examiner* — Prasith Thammavong
(74) *Attorney, Agent, or Firm* — Stephen R. Tkacs; Stephen J. Walder, Jr.; Randall J. Bluestone

(57) ABSTRACT

Mechanisms identify one or more first storage devices in a first tier of the tiered storage system that may be placed in a minimal power consumption state and identify one or more data segments stored on the one or more first storage devices that are most likely to be accessed during a period of time in which the one or more first storage devices are in the minimal power consumption state. The mechanisms migrate the one or more data segments to one or more second storage devices in one of the first tier or a second tier of the storage system and place the one or more first storage devices in the minimal power consumption state. Access requests to the one or more data segments are serviced by the one or more second storage devices while the one or more first storage devices are in the minimal power consumption state.

23 Claims, 11 Drawing Sheets

(56) References Cited

U.S. PATENT DOCUMENTS

| | | |
|---|---|---|
| 7,281,109 B2 | 10/2007 | Kano |
| 7,634,585 B2 | 12/2009 | Conley et al. |
| 2002/0103975 A1 | 8/2002 | Dawkins et al. |
| 2004/0250148 A1 | 12/2004 | Tsirkel et al. |
| 2005/0268062 A1 | 12/2005 | Nagase et al. |
| 2006/0004820 A1 | 1/2006 | Claudatos et al. |
| 2006/0010169 A1 | 1/2006 | Kitamura |
| 2006/0069862 A1 | 3/2006 | Kano |
| 2006/0143419 A1* | 6/2006 | Tulyani ............... 711/165 |
| 2006/0195659 A1 | 8/2006 | Kano |
| 2006/0236061 A1 | 10/2006 | Koclanes |
| 2006/0259728 A1* | 11/2006 | Chandrasekaran et al. .. 711/170 |
| 2007/0118710 A1 | 5/2007 | Yamakawa et al. |
| 2007/0136397 A1 | 6/2007 | Pragada et al. |
| 2007/0198797 A1 | 8/2007 | Kavuri et al. |
| 2007/0208788 A1 | 9/2007 | Chakravarty et al. |
| 2007/0239747 A1 | 10/2007 | Pepper |
| 2007/0239927 A1 | 10/2007 | Rogers et al. |
| 2007/0260834 A1 | 11/2007 | Kavuri et al. |
| 2007/0299959 A1 | 12/2007 | Penny et al. |
| 2008/0021859 A1 | 1/2008 | Berkhin et al. |
| 2008/0109629 A1 | 5/2008 | Karamcheti et al. |
| 2008/0126880 A1 | 5/2008 | Lee et al. |
| 2008/0158958 A1 | 7/2008 | Sokolov et al. |
| 2009/0112789 A1 | 4/2009 | Oliveira et al. |
| 2009/0112879 A1* | 4/2009 | Oliveira et al. ................. 707/10 |
| 2010/0122050 A1* | 5/2010 | Hutchison et al. ........... 711/162 |
| 2010/0199036 A1* | 8/2010 | Siewert et al. ............... 711/112 |
| 2010/0281230 A1 | 11/2010 | Rabii et al. |
| 2011/0010514 A1 | 1/2011 | Benhase et al. |
| 2011/0063748 A1 | 3/2011 | Song et al. |
| 2011/0213916 A1 | 9/2011 | Fujibayashi et al. |
| 2012/0203996 A1* | 8/2012 | Anderson et al. ............ 711/165 |

FOREIGN PATENT DOCUMENTS

| | | |
|---|---|---|
| EP | 0 670 543 A1 | 9/1995 |
| EP | 0 709 765 A2 | 5/1996 |
| JP | 2007-193441 | 8/2007 |
| JP | 2008-47156 A | 2/2008 |
| JP | 2011-003060 | 1/2011 |
| KR | 100801015 B1 | 2/2008 |
| WO | WO 2007/009910 A2 | 1/2007 |
| WO | WO 2008/007348 A1 | 1/2008 |
| WO | WO 2011/030290 A1 | 3/2011 |

OTHER PUBLICATIONS

"Disk spin-down: Power savings with a catch", SearchStorage.com, http://searchstorage.techtarget.com/feature/Disk-spin-down-Power-savings-with-a-catch, Jul. 2010, 3 pages.

"MAID (massive array of idle disks)", Definition from Whatis.com, http://searchstorage.techtarget.com/definition/MAID, accessed on Apr. 12, 2012, 3 pages.

"Silicon Motion's hybrid SLC/MLC SSD controller", Yahoo! Message Boards, posed on Jun. 24, 2008, http://messages.finance.yahoo.com/Stocks_(A_to_Z)/Stocks_S/threadview?m=tm&bn=22578&tid=10968&mid=10968&tof=18&off=1, 3 pages.

Chang, Li-Pin, "Hybrid Solid State Disks: Combining Heterogeneous NAND Flash in Large SSDs", ASPDAC 2008, http://www.aspdac.com/aspdac2008/Archive_Folder/5B_Slides/5B-1.pdf, 26 pages.

Otoo, Ekow et al., "Dynamic Data Reorganization for Energy Savings in Disk Storage Systems", Proceedings of the 22nd International Conference on Scientific and Statistical Database Management (SSDBM'10), LNCS 6187, 2010, pp. 322-341.

Schmid, Patrick, "Apacer Mixes Fast SLC with MLC Flash on a Single Drive", Tom's Hardware, Jun. 4, 2008, http://www.tomshardware.com/news/FlashSSD-SLC-MLC,5571.html, 2 pages.

Schulz, Greg, "The Many Faces of Maid Storage Technology", StorageIO, http://www.storageio.com/Reports/StorageIO_WP_Dec11_2007.pdf, Dec. 11, 2007, 4 pages.

\* cited by examiner

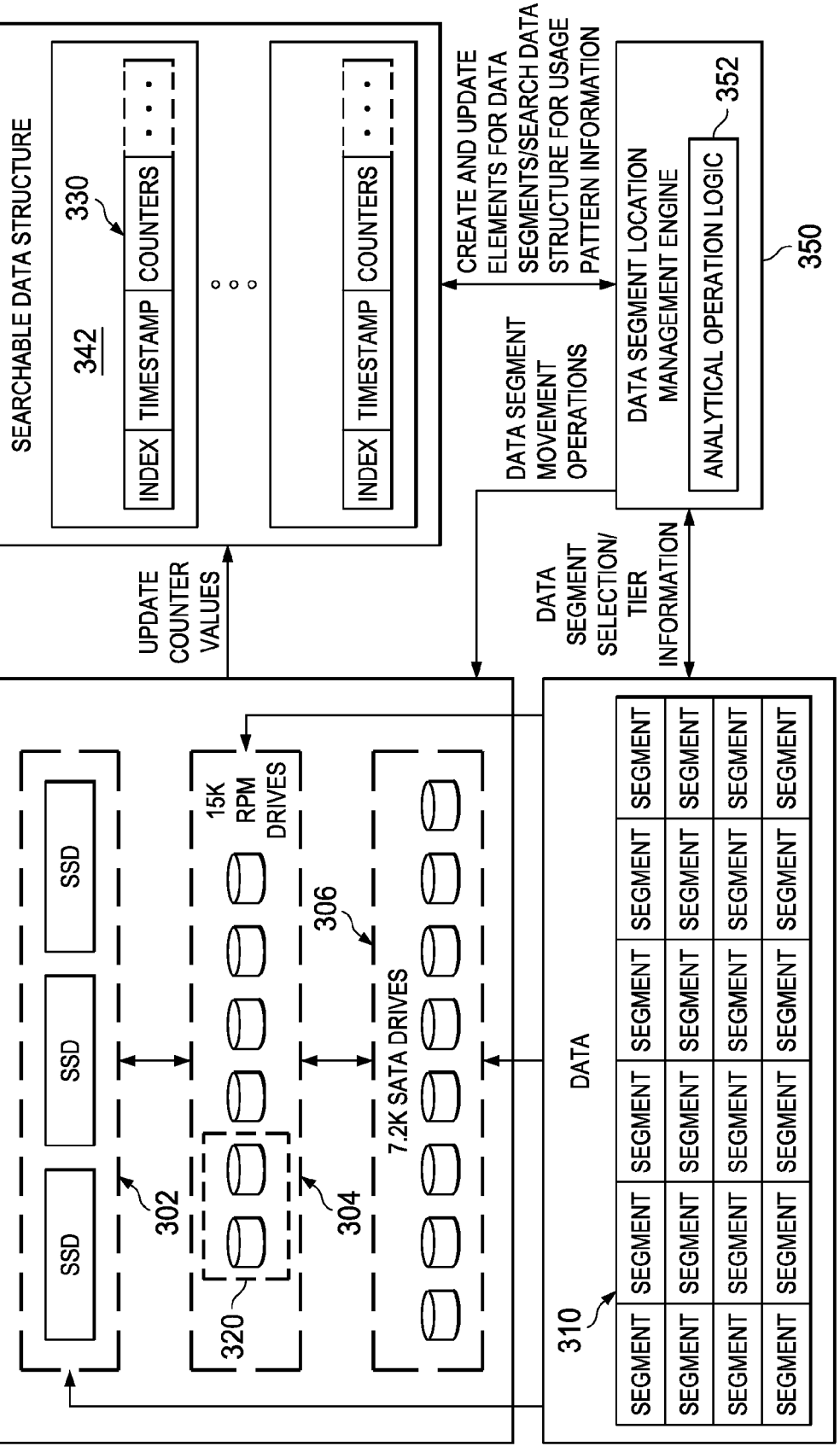

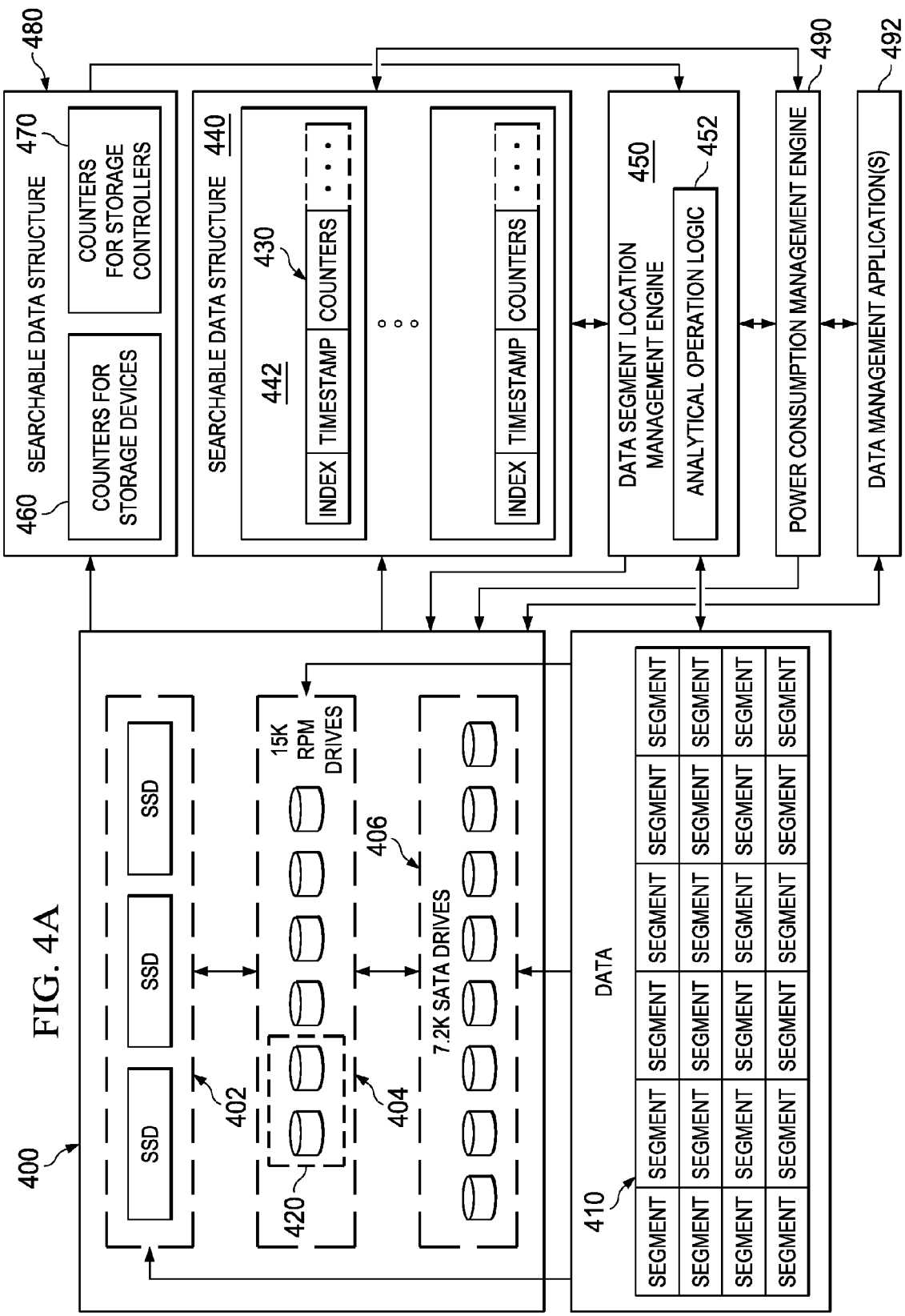

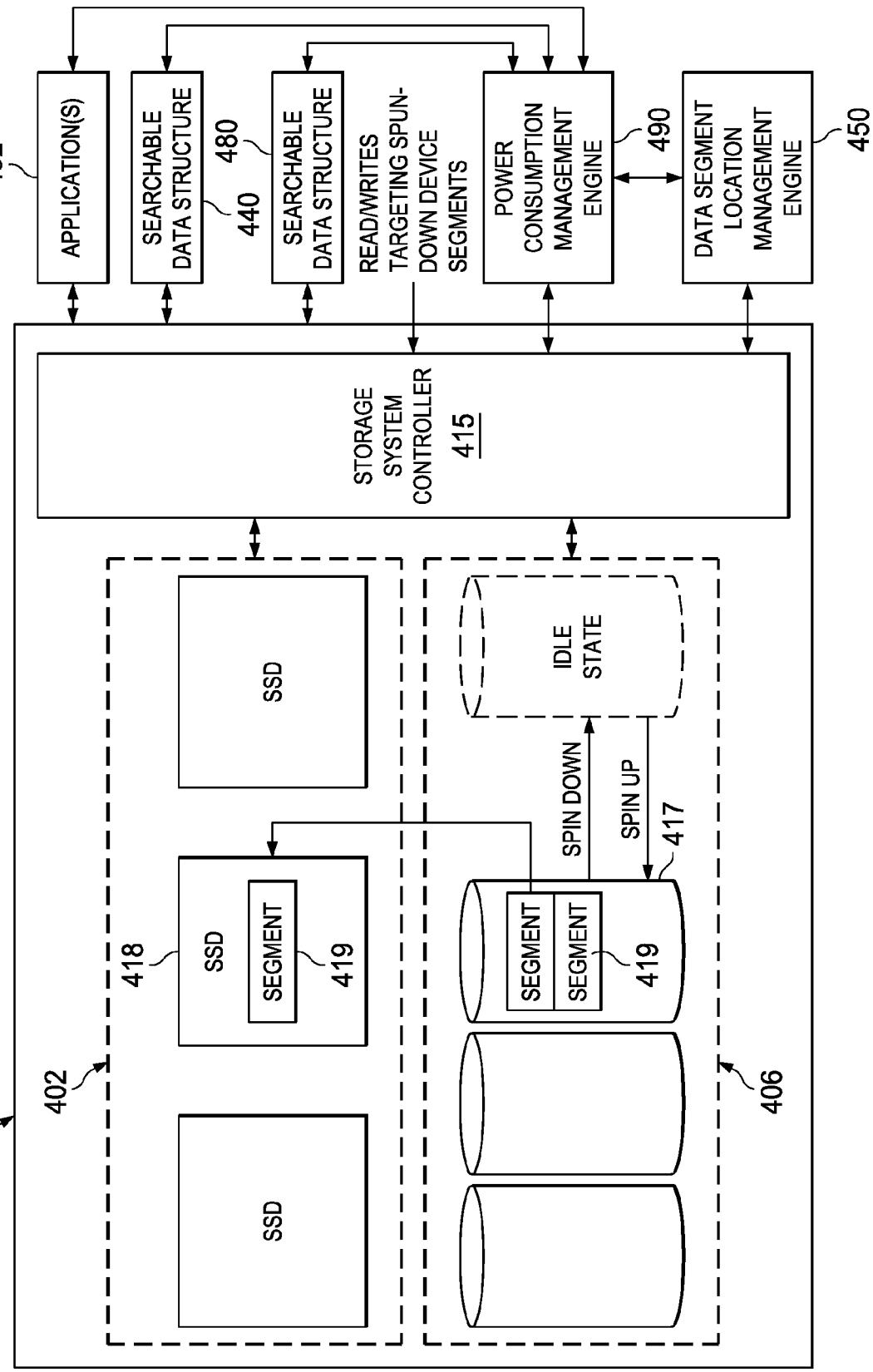

REDUCING POWER CONSUMPTION BY MIGRATION OF DATA WITHIN A TIERED STORAGE SYSTEM

BACKGROUND

The present application relates generally to an improved data processing apparatus and method and more specifically to a mechanism for reducing power consumption by migrating data between tiers of a tiered storage system.

Traditional storage models recognize two separate types of storage devices: online storage devices and offline storage devices. Online storage devices typically store transactional data requiring high availability, instant access, and steadfast reliability. Offline storage devices typically store archival data that is infrequently accessed and is stored for long periods of time. However, in the modern environment, data use has expanded beyond simple transactional and archival use. Thus, the concept of tiered storage systems has been introduced.

The concept of tiered storage is based on the varying performance of storage devices as well as the varying demands on performance of these storage devices from the various workloads encountered. Tiered storage involves having multiple logical and physical levels of storage devices based on the performance capabilities and costs of the storage devices and then storing data in these various levels of storage devices based on the expected demand for that data and the corresponding performance of the storage devices in that level of the tiered storage system.

Thus, for example, at a highest level of the tiered storage system, a plurality of storage devices having very high performance capabilities is provided. These storage devices are utilized in the tiered storage system with data that is expected to be required frequently and with minimal access delay. This tier of the tiered storage system is sometimes referred to as the "online" tier or T0. This tier will usually consist of storage devices which are the most expensive to manufacture and purchase.

A middle tier of the tiered storage system, sometimes referred to as the "nearline" tier or T1, has storage devices that have a lower performance capability than the highest level of the tiered storage system but still have sufficient performance to handle accesses to data that are accessed on a regular basis but not as often as the data stored in the highest tier or whose access can tolerate larger access delays due to lower performance measures of the storage devices in this middle tier of the tiered storage system. There may be multiple middle tiers in a tiered storage system based on the complexity of the tiered storage system and the differing performance capabilities of the storage devices employed.

A bottom tier of the tiered storage system, sometimes referred to as the "offline" tier, may be comprised of relatively low performance storage devices. This tier is often used to archive data or store data that is infrequently accessed and thus, the access delay associated with these storage devices is not of a concern.

The reason to implement such tiered storage systems is not only based on the various demands for storage device performance by the workloads in today's computing environments, but also on the cost of such storage devices. Costs of storage devices are proportional to the performance of the storage device. That is, higher performance storage devices cost considerably more than lower performance storage devices. As a result, it is less costly to have a large number of lower performance storage devices than to have a large number of high performance storage devices. As a result, in a tiered storage system, a relatively smaller set of high performance storage devices may be used to handle data requiring high availability and instant access. Meanwhile, a relatively larger set of lower performance storage devices may be used to store data for archival purposes or for infrequently accessed data. A middle sized set of intermediately performing storage devices can be used to handle data requiring regular access. As a result, the cost of the storage system may be minimized while still accommodating the workload demands using a tiered approach.

SUMMARY

In one illustrative embodiment, a method, in a data processing system, for managing data segments in a tiered storage system is provided. The method comprises identifying one or more first storage devices in a first tier of the tiered storage system that may be placed in a minimal power consumption state. The method further comprises identifying one or more data segments stored on the one or more first storage devices that are most likely to be accessed during a period of time in which the one or more first storage devices are in the minimal power consumption state. Moreover, the method comprises migrating the one or more data segments to one or more second storage devices in one of the first tier or a second tier of the storage system. In addition, the method comprises placing the one or more first storage devices in the minimal power consumption state. Access requests to the one or more data segments are serviced by the one or more second storage devices while the one or more first storage devices are in the minimal power consumption state.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example logical diagram of a tiered storage system in accordance with one illustrative embodiment;

FIG. 4A is an example logical diagram of a tiered storage system in accordance with an alternative embodiment in which operations per second measures associated with storage devices and storage controllers are utilized;

FIG. 4B is an example diagram illustrating an example operation of a power consumption management engine in accordance with one illustrative embodiment;

DETAILED DESCRIPTION

Figure 1:
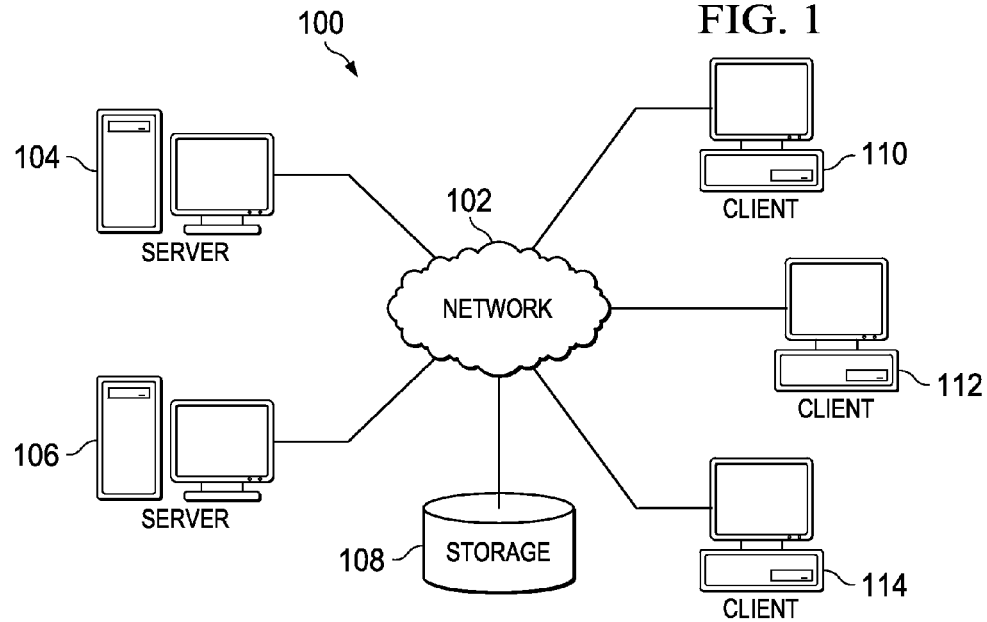
FIG. 1 is an example pictorial representation of a distributed data processing system in which aspects of the illustrative embodiments may be implemented.

In large data centers, reduction in power consumption is a major area of concern in terms of data center costs as well as making data centers comply with environmental norms or even possibly governmental regulations. Due to the dramatic increase of data and the proliferation of storage within data centers, a significant portion of the total power consumption within a data center consists of power usage by storage devices. Thus, reducing power usage of storage devices can have a significant impact on the total power utilization within a data center.

With regard to the individual storage devices of a data center, a significant amount of power is consumed in keeping disk spindles of hard disk drives spinning when there is no ongoing input/output (I/O) activity, i.e. keeping the hard disk drives available for access should an I/O request be received. This is because "spinning-down" drives, i.e. slowing or discontinuing the spinning of the spindles of the hard disk drives, is associated with a significant performance penalty if the hard disk drive has to be "spun-up", i.e. increasing the spinning of the spindle to a speed where data access from the hard disks is made possible, each time the hard disk drive has to access data. I/O requests that require a hard disk drive to be spun-up experience a much higher latency than a normal seek time of the hard disk drive that is already at normal rotational speed for accessing the data. Thus, the challenge is to be able to spin-down HDDs to reduce power consumption yet do so in a manner that does not negatively impact I/O performance substantially.

One option for spinning-down HDDs is to use a Massive Array of Idle Disks (MAID) system, which is typically used to replace magnetic tape storage systems. With a MAID system, only the drives that are being actively used are spinning at any given time while the remaining drives are not spinning. While this reduces power consumption and prolongs the lives of the drives in the MAID system, MAID systems suffer from the performance drawbacks discussed above in that accesses to drives that are currently idle incur the performance penalty of having to be spun-up before being able to be accessed. Such performance penalties may not be viable for many applications.

The illustrative embodiments provide a mechanism for adjusting the location of data in a tiered storage system so as to reduce power consumption of the tiered storage system during off-peak hours of operation. The reduction in power consumption is achieved by migrating data from lower tiered storage devices, such as hard disk drives and the like, that consume relatively larger amounts of power to maintain an accessible state. For example, in the case of hard disk drives (HDDs), HDDs whose data is unlikely to be access during off-peak hours may be identified. The data on these identified HDDs that is most likely to be accessed during the off-peak hours of operation, if any, may be identified and migrated to a higher level of the tiered storage system, such as to solid state drives (SSDs), other higher performance HDDs, or the like. The HDDs from which the data is migrated may then be spun-down so that they are at a minimal power consumption state during the off-peak hours of operation.

During the off-peak hours of operation, the SSDs may service access requests to the migrated data by responding with the requested data (reads) or updating the state of the data (writes). In this way, the data may still be accessed without incurring the latency of spinning-up the HDDs while achieving the power consumption savings of maintaining the HDDs at a minimal power consumption state. Prior to the peak hours of operation resuming, the HDDs may again be spun-up and the current state of the migrated data may be updated using the copy of the data in the SSDs, thereby migrating the data back to the HDDs.

In one illustrative embodiment, the upper-tier storage devices to which data is migrated during off-peak hours may operate as a queue of the reads/writes to the migrated data. When this queue becomes full, i.e. the number of reads/writes to the migrated data reaches or exceeds one or more predetermined thresholds, then the data may be migrated back to the spun-down HDDs. This will involve spinning-up the HDDs and then copying the state of the migrated data back to the appropriate locations on the now spun-up HDDs.

The illustrative embodiments may gather usage pattern statistics over specified periods of time to identify "hot spots" and "cold spots" within a tiered storage system, such as may be implemented in a data center or the like. The detection of "cold spots" may be used to identify, for example, storage devices that may be relatively infrequently accessed during specified periods of time. The detection of "hot spots" may be used to identify portions of data on these "cold" storage devices that should be migrated to other levels of storage during the specified period of time, i.e. during off-peak hours, so that access to this "hot spot" data is still made possible while the "cold" storage device is spun-down to a low or minimal power consumption state, e.g., placed in an idle state.

The identification of "hot spots" and "cold spots" in the tiered storage system may be facilitated by, for example, by recording usage patterns observed over a period of time and/or by means of application integration in which the operations of the application are analyzed to predict which portions of a tiered storage system are likely to be accessed at different specified periods of time. These mechanisms may be used in the context of a tiered storage system in which mechanisms are presented for migrating data between levels of the tiered storage system in accordance with the relative frequency at which the data is accessed or utilized.

Thus, hereafter, the illustrative embodiments of the present invention will be described in the context of such a tiered storage system.

One way in which the mechanisms of the illustrative embodiments may obtain and record usage pattern information regarding the various storage devices and portions of data on the storage devices is to utilize counters. For example, in one illustrative embodiment, all data in a tiered storage system is segmented into relatively small but manageable chunks, referred to as segments. Counters are maintained for each of these segments. When a segment's access density exceeds a threshold, T+, the segment is dynamically moved from a lower tier to a higher tier in the storage system, if a higher tier is available. If the access density drops below another threshold, T−, then the segment is demoted or dynamically moved to a lower tier in the storage system. Counters are used which bias recent activity and the thresholds are dynamically tuned to try and keep the highest tiers of the storage system as full as possible. Moreover, these counters are used to keep the access density of the highest tier as high as possible, where access density is the mean accesses per unit amount of storage, e.g., accesses per GB. Ideally the N data segments residing in the highest tier, T0, should be the N most accessed segments in the tiered storage system.

In addition to counters for each segment, counters may be utilized for each storage device within one or more tiers of the storage system, e.g., only the top tier of the storage system, all tiers of the storage system, or the like, so as to keep measures of the number of operations per second for each storage device, maximum operations for each storage device in the one or more tiers. Other counters may also be utilized with storage level controllers for identifying maximum and actual numbers of operations handled by these controllers. From this information projected operations per second may be calculated and used in decisions as to where to locate data in the tiers of the storage system. Based on the projected operations per second of the segments of data that are to be moved as well as the projected operations per second of the controllers and storage devices to which the data segments are to be moved, a determination can be dynamically and automatically made as to the best location within the tiered storage system for the data segments.

In accordance with the illustrative embodiments, these counters may be used, in addition to identifying a most efficient location of the data within the tiered storage system, to identify "hot spots" and "cold spots" within the tiered storage system for purposes of reducing power consumption. That is, the counters may have a dual purpose of being used to move data between tiers of the storage system during normal peak hours of operation, and further may be used to identify storage devices of lower tiers that may be spun-down during off-peak hours of operation and what data on these spun-down storage devices should be migrated to higher tiers during off-peak hours to ensure availability of the "hot spot" data on these "cold" storage devices.

In some illustrative embodiments, the values of the counters may be maintained in association with a BTree or other searchable data structure representative of the tiered storage system. The values of the counters may be maintained for increments of time greater than a time it takes to move data between tiers of the storage system. This searchable data structure may then be used to perform a variety of background analytical operations to create policies to be applied to the data segments stored in the tiered storage system. Such policies may initiate tasks to promote and demote data segments at particular times or when other segments are promoted or demoted, for example. In addition, with the illustrative embodiments, policies may be generated for the spinning-down and spinning-up of certain ones of the storage devices in accordance with the detection of "hot spots", "cold spots", and the like. Additional details of each of these mechanisms of the illustrative embodiments will be set forth hereafter.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a storage area network (SAN), or the connection may be made to an external computer (for example, through the Internet using an Internet Service Provider). Moreover, the program code may be run in an external storage system which contains computers such as servers or customized or specialized hardware.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
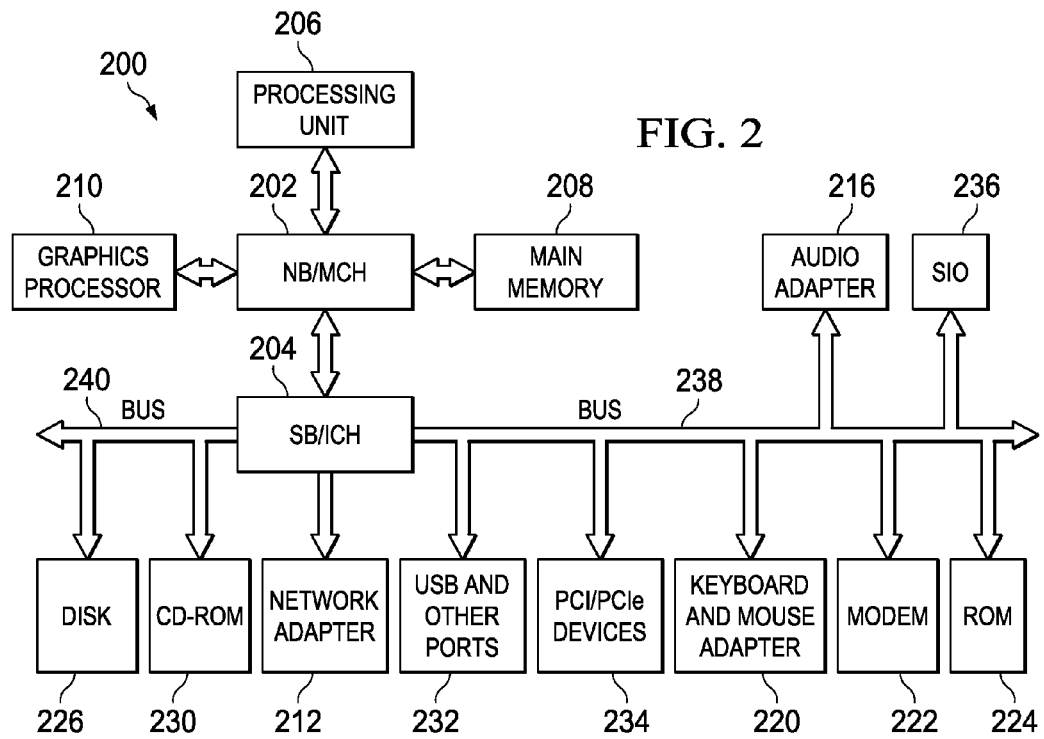
FIG. 2 is an example block diagram of a data processing device in which aspects of the illustrative embodiments may be implemented.

The illustrative embodiments may be utilized in many different types of data processing environments including a distributed data processing environment, a single data processing device, a cloud computing system, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a tiered storage system in a distributed data processing system implementation this is only an example and is not intended to state or imply any limitation with regard to the features of the present invention. To the contrary, the illustrative embodiments are intended to include single data processing device environments and any other embodiments in which a tiered storage system may be utilized. Moreover, the illustrative embodiments may be implemented in systems having a single server or computer accessing a storage system. The computer may or may not have multiple virtual partitions running on it, such as logical partitions (LPARs).

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. Storage unit 108 may be any type of storage unit or storage system. Examples of storage unit 108 may include an advanced storage device, such as a DS8000 dual node controller, or a file server, such as a network attached storage (NAS) device.

In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. The illustrative embodiments are also particularly well suited for implementation with networks, such as SANs, where the wires and switches utilize Fibre Channel, iSCSI, FCOCEE, or the like technologies. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed. Moreover, in one illustrative embodiment, the data processing system 200 may be comprised of one or more System p servers with a network of host adapters to communicate over the network 102 in FIG. 1, and a network of RAID adapters to communicate to a plethora of storage devices.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With regard to the illustrative embodiments, one or more of the data processing systems and/or storage systems may include a tiered storage system upon which the mechanisms of the illustrative embodiments may be implemented. The illustrative embodiments operate to optimize the location of data segments within a tiered storage system so as to make efficient use of the varying performance characteristics of the various tiers of storage devices within the tiered storage system. Moreover, the illustrative embodiments provide mechanisms for reducing power consumption of a tiered storage system by providing functionality for migrating "hot spot" data from lower tier storage devices so that these lower tier storage devices may be placed in a minimal power consumption state during off-peak hours of operation. The illustrative embodiments further provide mechanisms for determining when to cause these lower tier storage devices to exit the minimal power consumption state and copy over the current state of the migrated data back to the now fully operational lower tier storage devices.

FIG. 3 is an example logical diagram of a tiered storage system in accordance with one illustrative embodiment. The tiered storage system in FIG. 3 may be implemented in a distributed data processing system or single data processing device, for example. The storage devices of the tiered storage system may be part of the network attached storage unit 108, for example, may be associated with one or more server computing devices, such as servers 104 and 106 in FIG. 1, or may be part of, or associated with, a client computing device, such as client computers 110-114. Thus, the tiered storage system may be part of a stand-alone computer, associated with a client computer, associated with a server, or may be part of a network attached storage system. In one illustrative embodiment, network 102 may be a SAN with storage unit 108 being an external block oriented device or a network of block oriented storage devices controlled by a virtual SAN controller, such as SAN Volume Controller™ (SVC), available from International Business Machines Corporation of Armonk, N.Y.

Storage devices of individual tiers within the tiered storage system may be associated with different computing devices from storage devices of other tiers in the tiered storage system. Thus, for example, the storage devices of a first tier may be associated with a first storage system or server and the storage devices of a second tier may be associated with a second storage system or server. Moreover, the storage devices of the tiers may simply be different types of storage devices controlled by an external storage controller device. For example, some of the storage devices may comprise a first enclosure of solid state disks (SSDs), a second enclosure of 15K hard disks (HDDs), and third enclosure of 7.2K HDDs, and a set of tape drives, all controlled by one or more external storage controller devices. Any combination of computing devices and tiers of the tiered storage system is intended to be within the spirit and scope of the illustrative embodiments.

As shown in FIG. 3, the tiered storage system 300 is comprised of a plurality of tiers 302-306 of storage devices with each tier having storage devices with similar performance characteristics. Between tiers, the storage devices have differing performance characteristics. With the illustrative embodiments, storage devices having relatively higher performance characteristics, e.g., number of operations per second, access latency, etc., are placed in higher tiers while storage devices having relatively lower performance characteristics are placed in lower tiers of the tiered storage system 300. Storage devices in higher tiers are able to perform a relatively larger number of read and write operations per second than those on lower tiers. For example, an SSD in the highest tier, T0, may be able to perform 50,000 read operations and 15,000 write operations per second while a storage device in a middle tier, T1, may only be able to perform 300 read or write operations per second. Storage devices in a lowest tier, T2, may only be able to perform 100 read or write operations per second. With the latency metric, i.e. the time it takes to get the data back from storage or to store the data to storage, T0 storage devices may take 250 µs while T1 storage devices may take 5 ms and T2 storage devices may take 10 ms. Moreover, additional tiers that may be powered off, such as tape storage devices, may take many seconds to obtain data from the storage device or store data to the storage device.

In the depicted example, the tiered storage system 300 has three tiers 302-306 with the highest tier 302 having highest relative performance characteristics, the lowest tier 306 having the lowest relative performance characteristics, and the middle tier 304 having an intermediate level of performance characteristics. As an example, the lowest performance characteristic storage devices of the lowest tier 306 may comprise relatively slow access time hard disks, magnetic tape storage devices, or the like. The highest tier 302 may be comprised of relatively high speed hard disks and the middle tier 304 may be comprised of intermediate level speed hard disks. In one illustrative embodiment, the highest tier 302 is actually comprised of one or more solid state disks (SSDs). An SSD is a data storage device that uses solid-state memory to store persistent data. SSDs emulate hard drive interfaces thereby easily replacing hard drives in most applications. An SSD using SRAM or DRAM (instead of flash memory) is often referred to as a RAM-drive.

In one illustrative embodiment, data in the tiered storage system is segmented into relatively small but manageable chunks, referred to as data segments 310. In a Small Computer System Interface (SCSI) implementation of the tiered storage system 300, a logical unit number (LUN) 320 of a storage device in a tier 302-306 of the tiered storage system 300 may be comprised of a plurality of these data segments 310. Thus, in a tiered storage system, the LUNs 320 may be spread over multiple storage devices. For example, a LUN 320 may be striped over many storage devices and further broken down into segments. The segments of that LUN 320 may move around to the different tiers based on access usage patterns. A LUN may be many Terra Bytes in size whereas a data segment may be relatively small, such as 10 MB. In other implementations, rather than using LUNs, other logical representations of portions of storage may be utilized, such as volumes (used with mainframe computers), or the like.

The data segments may be of any suitable size with the size being determined, for example, by weighing performance factors such as time required to move data segments of the particular size from one tier to another (which would be larger for segments of larger size), the size of data structures required to manage the segments (which would be larger for segments of smaller size), the probability of moving data into high performance storage systems, as part of the data segment, that is not highly accessed (which is a greater probability with larger segment sizes), the total capacity of a tier in the tiered storage system, and the like. In one illustrative embodiment, taking these and other factors into account, the size of a data segment may be approximately 10 MB. Of course other sizes, including 1 MB, 100 MB, or the like, may be used without departing from the spirit and scope of the illustrative embodiments.

Counters 330 are maintained for each of these data segments 310 to monitor the effective access density of these data segments in each tier. Effective access density is the rate at which the data segment is accessed in the tier in which it resides, over some give period of time. The counters operate for a predetermined time interval to count the number of operations accessing the corresponding data segment for that predetermined time interval. In one illustrative embodiment, the counters 330 may count the number of total operations over the predetermined time interval regardless of whether the operation is a read or write operation. However, in some illustrative embodiments, there may be separate counters for read operations and write operations, such as in embodiments where there are asymmetric access parameters for the two types of operations.

The counters 330 may be reinitialized at the end of a monitoring period, which may be longer than the time interval over which the counter performs its counting operations, to continue their counting operation for a time interval in a next monitoring period. For example, a time interval may be a 30 minute time interval, but the monitoring period may be an hour, a day, a week, a month, a year, or the like.

Thus, in one illustrative embodiment, the counters provide a measure of the operations per second associated with the corresponding data segment, i.e. the number of operations as identified by the value of the counter divided by the time interval. This measure of operations per second for the specified time interval may be written to a separate data structure for subsequent use or maintained as a counter value in a data structure in which the counter 330 is implemented.

For example, the values of the counters 330 may be maintained in a searchable data structure in association with the data segments. For purposes of the following description, an illustrative embodiment is described in which a Btree data structure 340 is used to maintain the counters 330 for data segments 310 of the tiered storage system 300. A Btree data structure is a tree data structure that keeps data sorted and allows searches, insertions, and deletions in logarithmic amortized time. Unlike self-balancing binary search trees, a Btree is optimized for systems that read and write large blocks (or segments) of data. In a Btree, internal (non-leaf) nodes can have a variable number of child nodes within a pre-defined range. When data is inserted or removed from a node, its number of child nodes changes. In order to maintain the pre-defined range, internal nodes may be joined or split. Because a range of child nodes is permitted, Btrees do not need rebalancing as frequently as other self-balancing search trees. The lower and upper bounds on the number of child nodes are typically fixed for a particular implementation. For example, in a 2-3 Btree (often simply referred to as a 2-3 tree), each internal node may have only 2 or 3 child nodes. A Btree is kept balanced by requiring that all external nodes are at the same depth. This depth will increase slowly as elements are added to the tree, but an increase in the overall depth is infrequent and results in all leaf nodes being one more node further away from the root.

It should be appreciated that while the illustrative embodiments utilize the Btree data structure to provide a searchable data structure for accessing performance information for the individual data segments, the illustrative embodiments are not limited to utilizing a Btree data structure. Rather, any searchable data structure may be utilized for maintaining counter information, and other performance information depending upon the implementation, for use in determining if and how to adjust the location of data segments within a tiered storage system.

A data segment location management engine 350 utilizes the information stored in the searchable data structure 340 to perform background analytical operations to make residence determinations and automatically generate data segment storage policies to be automatically implemented within the tiered storage system 300. The data segment location management engine 350 comprises logic 352, provided either as software instructions, hardware logic, or any combination of software and hardware based logic, to perform the various analytical operations and control movement of data segments between tiers 302-306 of the tiered storage system 300 in response to the results of such analytical operations. Thus, based on these analytical operations and determinations, data segments may be moved from one tier 302-306 to another within the tiered storage system 300 based on whether the effective access density, indicative of usage patterns, and/or other factors indicate that a particular data segment should be promoted or demoted within the tiered storage system 300.

Assuming the use of a Btree searchable data structure, the creation of entries in this Btree and use of the Btree to obtain information about data segments will now be described. As noted above, the data in the tiered storage system 300 is broken up into chunks or segments 310 which, in one illustrative embodiment, have a size of approximately 10 MB. A Btree insertion is performed by the data segment location management engine 350 whenever a 10 MB segment 310 is created or first accessed. The index for the created element, e.g., element 342 in FIG. 3, in the Btree is the starting address of the data segment 310. This index is stored in the element 342 along with a first timestamp of creation of the element. The size of the element 342 in the Btree is such that values of counters may be stored for a predetermined period of time. For example, in one illustrative embodiment, the counters count access operations to a data segment for a time interval of 15 or 30 minutes. The element 342 has a sufficient size to store values for such counters for a calendar year.

For example, a 3 byte counter allows for approximately 16M counts within a 30 minute interval, i.e. 3 bytes is 24 bits leading to a maximum value stored in the 3 bytes of $2**24-1=16,777,215$. For a 30 minute interval, a maximum value would represent approximately 9,000 operations/second, i.e. $16,777,215/(30*60 \text{ seconds})=9,320.675$ operations per second. Thus, allowing for a calendar year of counter value storage, with the counter values having 3 bytes and counting for 30 minute time intervals, one would need 52,560 bytes to maintain the counter values. These counters may wrap after the calendar year to allow for additional monitoring from year to year. Adding an additional 4 bytes for the initial timestamp and another 4 bytes for the index pointer results in a size for the element in the Btree of 52,568 bytes. This may be rounded up to 64K to allow for the storage of trend information and other data segment usage information, metadata, or the like, that may be used with analytical operations depending upon the implementation. This is approximately 0.7% overhead (amount of counter data divided by the size of the data segment). If a user wants less overhead, the data segment size may be increased or the predetermined time interval period may be increased.

The counters 330 may be incremented each time there is an access operation to the corresponding data segment for the time interval corresponding to that counter 330. The particular counter value 330 to increment within an element 342 may be determined by a simple comparison of the current timestamp with the initial timestamp. For example, the difference between the timestamps divided by the time interval over which each counter 330 counts is indicative of which 3 byte value within the element should be incremented at the current time. The searchable data structure 340 storing these counters is preferably pageable and cacheable in a disk cache.

The data segment location management engine 350 may perform many different types of analytical operations based on the information stored in the searchable data structure 340. These various analytical operations may be performed as background operations and may be used to automatically make residence decisions for data segments, automatically move data segments based on these residence decisions, as well as automatically generate policies to handle future storage of data segments within tiers 302-306 of the tiered storage system 300. Moreover, these analytical operations may be used to predict when data segments may be likely to be accessed and move the data segments into higher tiers before the higher access time is predicted. These analytical operations may be performed on a continual basis, at periodic times (such as at the end of each time interval), or at the end of the monitoring period before the counters wrap to the next monitoring period, e.g., at the end of the calendar year.

These analytical operations may be performed, for example by the analytical operation Logic 352, as previously mentioned above.

For example, the data segment location management engine 350 may perform an analytical operation to determine if the distribution of the operations per second for a data segment over a plurality of time intervals is basically uniform, i.e. the data segment has an access density pattern that is relatively unchanged over time. That is, there is not a significant difference between the operations per second of one time interval relative the other time intervals. A data segment with a high uniform access density can be placed in a high speed tier, e.g., tier T0, and left there until the data segment's access pattern changes.

In such a case, the data segment location management engine 350 may compare the operations per second (such as for a most recent time interval or for a particular period of time from a current time), or an average of the operations per second over the time intervals considered, with one or more predetermined thresholds indicative of whether to promote or demote the data segment from a current tier 302-306 of the tiered storage system 300 to another of the tiers 302-306. There may be one or more predetermined thresholds per tier 302-306 such that a different threshold may be used for promotion from a middle tier 304 to a highest tier 302 than a threshold for promotion from a lowest tier 306 to the middle tier 304, for example.

If the operations per second, or average operations per second, meet or exceed a promotion threshold, then the data segment is flagged for promotion to the next higher tier 302-306. If the operations per second, or average operations per second, meet or fall below a demotion threshold, then the data segment may be flagged for demotion to a next lower tier 304-306. If the operations per second, or average operations per second, do not meet, exceed, or fall below these thresholds, but are within a tolerance of the thresholds, then they may be placed on a watch list and monitored for possible demotion or promotion. Data segments on the watch list may be checked on a more frequent basis using such analytical operations to determine if they should be promoted or demoted. If, during these more frequent checks, the operations per second, i.e. access density, meets, exceeds, or falls below one of these thresholds, then the data segment may be removed from the watch list and either promoted or demoted according to the threshold met, exceeded, or fallen below.

The data segment location management engine 350 may further perform analytical operations to determine if there are any data segments that have zero accesses within the time interval(s) considered. Moreover, the data segment location management engine 350 may also identify whether or not there are regularly occurring periods of no accesses, e.g., during the first N days of the month, this data segment is not accessed, so that a corresponding policy may be automatically generated to demote the data segment prior to such period.

For those data segments that have zero accesses within the time interval(s), these data segments may be placed in another watch list, referred to as the zero access watch list, for possible movement to a storage device that can be powered down or moved to a magnetic tape for longer periods of time, e.g., an archival storage device. For data segments that are on the zero access watch list, these data segments may be checked to determine if they do not receive any access operations within an additional predetermined time interval. If the data segments again do not receive any access operations within this additional predetermined time interval, then the data segments may be moved to the archival storage device. Alternatively, the data segments may be placed on a queue of actions to be performed at a specific time in the future, e.g., at time X, move data segment Y to tier 3.

Furthermore, in accordance with additional aspects of the illustrative embodiments, such identification of zero accesses within various time intervals may be used as a basis for identifying off-peak hours of operations for various storage tiers or individual storage devices. The identification of such off-peak hours of operation may be used to set time boundaries where the additional functionality for reducing power consumption is performed in accordance with the illustrative embodiments. Data accesses at other time periods, i.e. non-off-peak hours of operation, for these storage tiers or individual storage devices, may be used to identify portions of data on the storage devices that may need to be migrated during off-peak hours of operation in order to ensure that he most probable data to be accessed from these storage devices is made available on another tier of the storage system. Then, during the off-peak hours of operation, the storage tier or individual storage devices may be placed in a minimal power consumption state until a scheduled time, or an event occurs, that requires returning the storage tier or storage devices to an higher power consumption operational state. These operations will be described in greater detail hereafter with reference to the power consumption management engine 360.

The data segment location management engine 350 may perform further analytical operations for data segments having non-uniform distributions of access operations. For those data segments whose operations per second represent non-uniform distributions with spikes above the predetermined threshold, and the number of these spikes are equal to or greater than a predetermined number of spikes, these data segments may be flagged by the data segment location management engine 350 for promotion to a next higher tier 302-306 of the tiered storage system 300. Similarly, for those data segments whose operations per second represent non-uniform distributions and there are not enough spikes above the predetermined threshold, i.e. the number of spikes is less than the predetermined number of spikes, these data segments are flagged by the data segment location management engine 350 for demotion to a next lower tier 302-306 of the tiered storage system 300.

The data segment location management engine 350 may further perform analytical operations to determine if the operations per second for a plurality of time periods has a substantially linearly increasing or decreasing trend, an exponentially increasing or decreasing trend, or other non-linear trend that may be formulated such that a prediction or extrapolation of operations per second for future time intervals may be made. The formulation of the increase or decrease may be used as a basis for predicting a point at which the operations per second for the data segment will meet or exceed a threshold for promotion of the data segment or meet or fall below a threshold for demotion of the data segment. For example, with a linearly increasing or decreasing trend, the slope of the line approximating the trend may be used to predict or extrapolate operations per second for future time intervals. As a result, the prediction or extrapolation can be used to schedule a movement of the data segment to another tier 302-306 in the tiered storage system 300 in anticipation of the operations per second being of a level where movement of the data segment is warranted.

Additional analytical operations that may be performed by the data segment location management engine 350 include analyzing the operations per second values stored by the counters to identify trends with regard to times of day, times of the week, quarterly trends, monthly trends, yearly trends, and the like. For example, the analytical operations may determine the reoccurrence of spikes up or down in the operations per second at these various time intervals. Based on the detected reoccurrence of these spikes, a policy may be automatically generated to move the data segment up or down in the tiers 302-306 of the tiered storage system 300 in advance of the expected spike. For example, if a spike occurs daily between midnight and 4 AM, then a policy may be automatically generated to more the data segment at 11:45 PM up to a higher tier 302-304 and to move the data segment back down to a lower tier 304-306 at 4:15 AM. Similar data segment movement policies may be automatically established for other time intervals and trends or detected reoccurrences.

Moreover, the data segment location management engine 350 may perform cross segmentation spike analytical operations to determine cross segmentation usage patterns. For example, the relationships between operations-per-second measures for different data segments may be evaluated to identify if there are any reoccurrences of relationships indicative of linked usage patterns between data segments. For example, when a first data segment A has a minor spike, then a second data segment B may have a major spike in operations-per-second on a reoccurring basis. As a result, the data segment location management engine 350 may automatically generate a policy to look for instances where the first data segment A has an operations per second measure that meets or exceeds a certain threshold, e.g., a value indicative of the minor spike, and then automatically promoting the second data segment B in response to the first data segment A's operations per second meeting or exceeding this threshold. In this way, segment B is promoted to a higher tier 302-304 in the tiered storage system 300 prior to the anticipated major spike in the operations per second associated with data segment B.

The determination of such cross segmentation spike relationships may take many different forms. In general, the cross segmentation spike analytical operations look for spikes in usage patterns for data segments where these spikes are a predetermined, or dynamically determined, threshold amount about a normal range, occur repetitively, and have a correlation between them. Thus, for example, the cross segmentation spike analysis may identify a spike in the usage pattern of particular data segment, having a sufficient size as determined by comparing the magnitude of the spike to the threshold, and then may look for spikes in the usage patterns of other data segments within a predetermined time range of the detected spike that are of sufficient size as determined by comparing their magnitudes with either the same or a different threshold amount above a normal range. Such correlated spikes may then be used as candidates for cross segmentation spike analysis to determine if a policy rule for the cross segmentation spike relationship should be generated.

A single instance of a spike in one data segment's usage pattern with a corresponding spike in another data segment's usage pattern is not typically sufficient for the cross segmentation spike analysis of the illustrative embodiments to determine that a policy should be generated. To the contrary, a counter may be associated with each of the identified cross segmentation spike relationships and may be incremented each time the relationship is observed by the analytical operations. Once this counter has a value that meets or exceeds a threshold value, the corresponding cross segmentation spike relationship may be considered for generation of a policy.

Alternatively, the counter value, or other mechanisms, may be used to generate a correlation factor for an identified cross segmentation spike relationship. For example, based on the counter value, a determination may be made that there is a 90% correlation between a first spike in usage pattern of a first data segment and a second spike in usage pattern of a second data segment, i.e. 9 out of 10 instances of the first spike are followed by the second spike within a prescribed time period. If this correlation is above a threshold correlation, indicative of a point at which a policy for the cross segmentation spike relationship should be generated, then a policy is generated for the cross segmentation spike relationship.

The particular threshold at which the policy is to be generated, as well as the threshold above normal usage at which a spike is determined to be of significant size for consideration in cross segmentation spike analysis, may be predetermined or may be dynamically determined based on the current operating conditions of the multi-tier storage system. For example, as the available storage space of a top tier, or middle tier, of the multi-tier storage system decreases, the thresholds may be adjusted higher thereby requiring a greater size spike and/or greater correlation between spikes for such cross segmentation spike relationships to be considered for generation of policy rules or for application of existing policy rules to adjust the movement and placement of data segments in tiers of the multi-tier storage system. This effectively makes it more difficult for data segments to be promoted to the higher tiers of the storage system when available space becomes less abundant. In addition, this reduces the likelihood that data segments already in the higher tiers are demoted to make room for other data segments requiring promotion. Of course other factors may be used to determine when and how to dynamically adjust thresholds without departing from the spirit and scope of the illustrative embodiments.

The policy rules that are generated as a result of this cross segmentation spike analysis may be time dependent or time independent. For example, if the cross segmentation spike analysis determines that every day at 7:45 am there is a spike in data segment A followed by a correlated spike in usage in data segment B, then the resulting policy rule may automatically promote both segment A and segment B at a time of 7:44 am every day in anticipation of the expected spike. Such time dependency may be based on date, time of day, day of the week, or any other time basis. With such time dependent policy rules, the application of the rule to modify the location of a data segment within the multi-tiered storage system is initiated in response to a current time being within a predetermined tolerance of a time associated with the policy rule.

Alternatively, the policy rule may state, for example, that at any time, if a spike in the usage pattern of data segment A is detected, data segment B is to be promoted because there is a correlation between spikes in the usage of data segment A being followed by spikes in data segment B usage. With such time independent policy rules, the application of the rule to modify the location of a data segment within the multi-tiered storage system is initiated in response to the occurrence of a particular condition with regard to a usage pattern of a data segment, e.g., a spike in excess of a certain threshold.

It should be noted that while the above cross segmentation spike analysis is described with regard to spikes meeting or exceeding a predetermined or dynamically determined threshold, these spikes need not be in a positive direction. That is, the spike does not have to be with regard to an increase in usage in the usage pattern for the data segment but instead, may be a negative spike in that usage may drastically decrease. Both positive and negative spikes may be considered as part of the cross segmentation spike analysis with corresponding movement of data segments from lower to higher, or higher to lower, tiers in the multi-tiered storage system.

In addition, while the above cross segmentation spike analysis and resulting policy rules are described in terms of only two data segments, e.g., segment A's relationship with segment B, the illustrative embodiments are not limited to such. Rather, the analysis and resulting policy rules may take into consideration any number of data segments, their corresponding usage patterns, and any spikes that may occur in their usage patterns. Thus, for example, a correlation between a positive spike in the usage pattern of data segment A with a positive spike in the usage pattern of data segment B may be further correlated with a negative spike in the usage pattern of data segment C. As a result, the policy rule may be of the type "If there is a positive spike in data segment A and a positive spike in data segment B, demote data segment C." Any correlations in spike behavior of usage patterns of data segments may be used to generate policy rules without departing from the spirit and scope of the illustrative embodiments.

As a further benefit of the illustrative embodiments, situations may be detected in which data segments may have been promoted but, due to current conditions of the higher tiers of the multi-tiered storage system, such promotion cannot be performed. For example, in some cases, it may be desirable to block the promotion of a data segment if there are already data segments in the higher tiers that have a similar priority. Moreover, there may be instances where the promotion of a data segment cannot be completed due to available space in higher tiers and a desire to not demote other data segments. As a result, a promotion operation may not be performed even though promotion may normally be performed.

Such situations may be detected by the mechanisms of the illustrative embodiments and an appropriate message may be output to a system administrator. The message may indicate the reason why such promotion was not accomplished and may provide suggestions as to how to avoid the blocking of such promotions in the future. For example, the mechanisms of the illustrative embodiments may suggest the addition of storage devices to one or more tiers of the multi-tiered storage system to allow for additional data segments to be promoted.

Other types of analytical operations may be performed in addition to or in replacement of one or more of the above described analytical operations. The analytical operations described above are only intended to be for purposes of illustration of examples of the types of analytical operations that may be performed and are not intended to state or imply any limitations with regard tot the types of analytical operations that may be performed by the data segment location management engine 350.

The above illustrative embodiments utilize counters for each data segment as a mechanism for measuring operations per second for predetermined time intervals and then using these measures to identify access trends, or usage patterns, of the data segments that are indicative of a need to promote or demote the data segment within a tiered storage system. This approach is used as a way of keeping data segments that require high availability at the highest tiers of the tiered storage system, comprised of relatively more costly storage devices, during time periods where accesses to these data segments are expected to be sufficiently high. The number of data segments that are maintained at the higher tiers of the tiered storage system are anticipated to be significantly less than data segments that do not require high availability. Moreover, this approach is used as a way of keeping data segments that do not require high availability at lower tiers of the tiered data storage system where the data may be stored on relatively lower cost storage devices.

In a further illustrative embodiment, as shown in FIG. 4A in which elements 400-450 operate in a similar manner as the corresponding elements 300-350 in FIG. 3 unless otherwise indicated herein, rather than relying solely on counters 430 measuring access operations to data segments 410, additional counters 460 may be provided for each of the storage devices in one or more of the tiers of the tiered storage system, e.g., only the top tier of the storage system, one or more of the highest tiers of the tiered storage system, or for all of the tiers of the tiered storage system, as well as counters 470 for the storage controllers 480 for the various storage devices in the tiers 402-406. These counters 460-470 may measure operations per second in a similar manner as noted above with regard to the counters 430 for the data segments. In addition, a value corresponding to the maximum operations per second for each storage device and controller may be maintained. These counters 460-470 may be stored in a searchable data structure 480 in a similar manner as the counters 430 for the data segments 410.

The data segment location management engine 450 may perform analytical operations similar to that described above with regard to data segment location management engine 350. However, the data segment location management engine 450 may further base such analytical operations on the measures of operations per second for the storage devices and controllers, as determined from the counters 460 and 470. For example, the operations per second measures for the storage devices and controllers may be used in projections of operations per second expected for future time periods, along with operations per second measures for data segments stored on these storage devices, or on which the data segments may be stored in response to a promotion or demotion operation, to determine what the expected operations per second will be at the future time periods. These projections may be used to determine whether or which storage devices and storage controllers are capable of handling the expected operations per second when other policies indicate that a promotion or demotion operation is to be performed.

For example, if a data segment is to be promoted to a particular tier of the tiered storage system due to the application of a promotion policy, the projections may be used to determine if and which storage devices and storage controllers in the tier to which the data segment is to be promoted will have the capacity to handle the operations per second expected for the data segment that is being promoted. If none of the storage devices/controllers are capable of handling the additional operations per second for the data segment, then the data segment location management engine 450 considers whether a demotion of the data segment, or other data segments that have relatively lower access usage in the target tier, to a lower tier would result in an overall performance enhancement.

It should be noted that while the tier to which the data segment is to be moved may have available storage capacity, this does not necessarily mean that the storage device/controller can handle the operations per second in an efficient manner to warrant or allow the promotion of the data segment to that tier. Thus, with the illustrative embodiments, storage capacity of the storage devices of a tier is not the only factor determining whether a data segment may be moved to that tier or not, but the ability of the storage devices/controllers to handle the additional operations per second and provide a desired level of performance, or data availability, is also considered. In this way, the user can also be notified by the data segment location management engine 450, such as via displayed message, activity report, or the like, that providing additional storage devices of a particular tier can provide a performance benefit either all of the time or at particular time periods as determined by the data segment location management engine 450. Moreover, the data segment location management engine 450 may also determine periods of the day, week, month, etc. that the end user may run certain applications in order to make the distribution to the tiers more uniform.

Whether or not the additional operations per second of the data segment can be handled by the storage devices/controllers of the tier may, in one illustrative embodiment, be determined based on a comparison of the projected operations per second (based on the values for the data segments and the storage devices/controllers) and the maximum values associated with the storage devices/controllers. If the maximum values will be exceeded by the addition of the operations per second of the data segments, then the data segment location management engine 450 may determine an alternative promotion/demotion of the data segments.

The projections and maximum values may further be used to determine when data segments should be promoted from lower tiers to higher tiers of the tiered storage system. For example, when a bottom tier's operations per second are reaching a maximum for the tier, then promotion may be made of the data segments having the highest operations per second. The tier to which to move the data segments may be determined based on how best to even out the tiers, whether some data segments that are in higher tiers have operations per second measures that are below those of the data segments being promoted, or the like.

Moreover, the data segment location management engine 450 may further monitor the counter values for the storage devices and controllers to determine if there is significant asymmetry between the tiers of the tiered storage system that warrants a rebalancing of the data segments. For example, if the data segment location management engine 450 detects an asymmetry and some storage devices/controllers of any of the tiers are at maximums or are significantly out of balance, then the data segment location management engine 450 may initiate data segment movement operations as necessary to rebalance the data segment loads on the storage devices/controllers of the tiers and alleviate any bottlenecks that may exist.

The above illustrative embodiments are described as performing comparisons against thresholds to determine whether a data segment should be promoted or demoted. While in some illustrative embodiments these thresholds may be static in nature, the illustrative embodiments are not limited to such. Rather, the thresholds may be initially set to low values and then adjusted as available storage capacity of the tiers reaches predetermined levels. For example, when the available storage capacity, i.e. the amount of available free space in the storage devices, of a tier reaches a first predetermined level, the thresholds may be adjusted so as to increase the required operations per second before a data segment may be promoted to the tier as well as increase the operations per second below which demotion may be performed. This essentially makes it more difficult for data segments to be moved into the tier and easier for data segments to be moved from the tier into lower tiers. Such adjustments may be made dynamically as the storage capacity of the tier increases/decreases over time thereby making it increasingly difficult to move data segments into the tier as the available storage capacity of the tier decreases. Using this dynamic approach, thresholds may be adjusted so as to promote keeping the tiers as balanced as possible.

With reference again to FIG. 4A, as a further functionality of the illustrative embodiments, a power consumption management engine 490 is provided for performing operations to minimize power consumption of the tiered storage system 400 while maintaining high accessibility of the data stored in the tiered storage system 400. The power consumption management engine 490 utilizes the observation that, during off-peak hours of operation, a very small percentage of storage available in a tiered storage system, such as in a data center, or the like, is actually used. Since this percentage is small, it is possible to move/migrate this small percentage of data to a small pool of the higher level tiers in the tiered storage system, e.g., the highest level tier such as the SSD tier, which consume much less power than the lower tier storage devices, e.g., the HDDs. Once this moving/migration of the small percentage of accessed data is achieved, application accesses can be served from the higher level tier storage devices, e.g., the SSDs, and the corresponding lower tier storage devices, e.g., the HDDs, may be spun-down or placed in a minimum power consumption state so as reduce power consumption of the tiered storage system as a whole.

In particular, the power consumption management engine 490 may operate to migrate "hot spot" data, i.e. the portions of data most likely to be accessed, from "cold" storage devices on lower tiers of the tiered storage system 400, i.e. storage devices that have a relatively low likelihood of being accessed, so that these lower tier storage devices may be placed into a minimum power consumption state during a specified period of time. Thereafter, either at a scheduled time point, or in response to a particular event or condition occurring, the state of the storage devices placed in the minimum power consumption state may be changed to a higher power consumption state and the current state of the migrated data may be copied back to the now higher power consumption state storage devices.

While the storage devices are in the minimum power consumption state, access requests to the data migrated from the minimum power consumption state storage devices to the higher level tiers of the storage system are redirected to these higher level tier storage devices. For example, any read write access requests that target data that was migrated from the minimum power state storage devices, may be collected in a pool of the higher tier storage devices, e.g., the read/write access requests may be serviced by the SSDs to which the data was migrated so that these SSD store the current state of the migrated data.

These accesses may be monitored, such as by way of counters or the like, to determine if a sufficient number of accesses occur to warrant restoring one or more of the minimum power consumption state storage devices to a higher power consumption state and migrating the data back to the higher power consumption state storage devices. If so, such operations may then be initiated. Alternatively, the exiting of the minimum power consumption state of these storage devices may be performed in response to a schedule, elapsed time period, or the like. For example, once placed in the minimum power consumption state, storage devices may be kept in this minimum power consumption state for a predetermined amount of time, e.g., 30 minutes or the like. In another embodiment, based on the analysis of counters described previously, the mechanisms of the illustrative embodiments may identify a schedule of peak, normal, and off-peak periods of time. Based on such a schedule, the storage devices may be placed in the minimum power consumption state, such as at off-peak periods of time, and returned to a normal power consumption state during normal or peak periods of time. In still another illustrative embodiment, a combination approach may be used in which a schedule is utilized, but when operating in a normal operational period of time, if a storage device is in a minimum power consumption state, the storage device may be kept in this minimum power consumption state until such a time that the number of access requests targeting portions of data migrated from these storage devices meets or exceeds a predetermined threshold value at which point the storage device may be transitioned back to a normal higher power consumption state and data may be migrated back to the now restored storage devices.

As a result of the operation of the mechanisms of the illustrative embodiments, during identified periods of time, the lower tier storage devices may be powered down to a minimum power consumption state after migrating the most likely to be accessed data from these devices to another storage device tier for handling while the lower tier storage devices are in the minimum power consumption state. This allows high accessibility of data while minimizing power consumption.

It should be appreciated that if a set of lower tier storage devices are likely to be accessed heavily, e.g., equal to or above a predetermined number of accesses within a given period of time as may be determined from the counters associated with the storage devices, even during off-peak hours of operation, those storage devices will not be placed in the minimum power consumption state and will not participate in power saving operations.

Application integration may also be used to determine if storage devices should be placed in a minimum power consumption state, either alone or in combination with the counter mechanisms described above. For example, if there are a set of hard disk drives (HDDs) that are likely to be backed up on a particular night or at a particular time, this information may be obtained by looking at the backup schedules, looking at the type of backup to be performed (full or incremental), and analyzing the data to determine those HDDs that will be heavily accessed during the backup operation. This information is available from configuration settings of the storage system, backup applications, or the like. Another example would be a set of HDDs that may be accessed by a data mining application, grid computing application, or the like, during off-peak hours of operation. In such cases, HDDs identified as being likely to be heavily accessed during the off-peak hours of operation, or other times in which the HDDs would be placed in a minimum power consumption state, are not placed in the minimum power consumption state.

The operations of the power consumption management engine 360 may be better understood with reference to the example shown in FIG. 4B. As shown in FIG. 4B, in addition to the data segment location management engine 450 the tiered storage system 400 may have an associated power consumption management engine 490 for minimizing power consumption of the storage devices 402-406 of the tiered storage system 400 during periods of reduced usage of the tiered storage system 400, e.g., during off-peak hours of operation. The periods of time that correspond to off-peak hours of operation may be identified through various analysis of counter values, such as described previously above, that indicate, for example, rates of access of storage devices or the like. Observing such counter values over specified periods of time provides an indication of a pattern of access of the storage devices that can be used to identify periods of time when particular storage devices are more or less utilized. As a result, off-peak hours of operation may be identified. During these off-peak hours of operation, the power consumption management engine 490 operates to place storage devices into minimum power consumption states after migrating data from these storage devices that is most likely to be accessed.

The power consumption management engine 490 may analyze the counter values in the counter data structure 440 and/or searchable data structure 480 for various storage devices and/or segments of data. Based on this analysis, a determination may be made as to when periods of time of off-peak utilization of the tiered storage system 400 are scheduled. These off-peak utilization periods are essentially temporal cold spots in which storage device utilization is either zero or relatively small compared to other periods of time, e.g., every day between the hours of 1 a.m. and 5 a.m., utilization is minimal indicative of a temporal cold spot. The power consumption management engine 490 may then schedule operations to place lower tiered storage devices, such as storage device 417, into a minimum power consumption state. In addition, the schedule of operations may further include operations for returning the lower tiered storage devices to a normal power consumption state at approximately an end of the period of time of off-peak utilization.

For example, the power consumption management engine 490 may analyze the counter values to determine a measure of access to storage devices of the tiered storage system 400 and determine whether this measure of access falls below and/or exceeds one or more thresholds. For example, the power consumption management engine 490 may determine points in time when the utilization of each of the storage devices, or entire tiers of the storage system 400, meet or fall below a first predetermined threshold value of a measure of access. Such points in time mark the beginning of a period of time of off-peak hours of utilization. Similarly, the power consumption management engine 490 may determine points in time when the utilization of each of the storage devices, or entire tiers of the storage system 400, meet or exceed a second predetermined threshold value of a measure of access. Such points in time mark the end of off-peak hours of utilization. From such comparisons to thresholds, a schedule of off-peak hours of utilization may be identified and corresponding operations may be scheduled for performing the power savings operations of the illustrative embodiments.

The power consumption management engine 490, either alternatively, or in combination with the counter value analysis described above, may be integrated or otherwise interface with one or more data management applications 492 to determine when such data management applications 492 may be utilizing the storage devices of the tiered storage system 400 even during off-peak hours of utilization, e.g., as part of a data backup operation or the like. As discussed above, the particular storage devices that will be affected by the operation of the one or more data management applications 492, as well as the type of data management operations that will be performed and other pertinent information, may be used to determine which storage devices will be affected and whether such operations require that the storage devices be in an operational state even during off-peak hours of utilization.

For example, the power consumption management engine 490 may interface with a data backup application 492 which operates to backup data on one or more of the storage devices of the storage tiers 402-406. The backup schedule maintained by the data backup application 492, as well as configuration data for identifying the types of backup operations to be performed, the particular storage devices affected, and the like, may be analyzed by the power consumption management engine 490 to determine which storage devices, or tiers of storage devices, in the tiered storage system 400 may be accessed by the backup application 492 and thus, needs to be in an operational state, even during off-peak hours of operation. Based on this information, while the counter value analysis described above may place a storage device in a classification for placement into a minimal power consumption state, the information obtained from the application 462 may be used to override this classification and instead, the storage device(s) may be maintained at a normal power consumption state.

Either at a scheduled point in time associated with the start of off-peak hours of utilization, such as a predetermined point in time just prior to the start of the off-peak hours of utilization, or in response to an event, such as a utilization measure for storage devices or tiers of storage devices satisfying conditions associated with one or more thresholds, the power consumption management engine 490 may initiate operations to place one or more of the storage devices in one or more of the tiers 402-406 of the tiered storage system 400 into a minimum power consumption state. For example, the power consumption management engine 490 may determine that, during the off-peak hours of utilization, the utilization of one or more selected storage devices, such as storage device 417 in the lower tier 406 of the tiered storage system 400, is such that it may be placed in a minimum power consumption state. Such determinations may further take into account the schedules, configuration information, and other information obtained from application integration with one or more applications 492 to determine which, if any, storage devices may be placed in a minimum power consumption state.

Moreover, the power consumption management engine 490 may, based on analysis of the counter values, and/or information obtained from application integration, identify segments of data stored on these one or more selected storage devices that are most likely to be accessed during the off-peak hours of utilization. That is, based on read/write accesses to the data during the off-peak hours of utilization during previous off-peak hours of utilization, the power consumption management engine 490 may determine which segments stored in the storage device 417 are most accessed during the off-peak hours of operation, accessed most in general over all time periods, or any other suitable measure of frequency or amount of access to segments of data. In this way, the most likely accessed segments of data can be predicted and used as a basis for determining which, if any, data segments stored in the storage device 417 should be migrated to another tier of the tiered storage system 400 before placing the storage device 417 in a minimum power consumption state. This migration ensures the accessibility of the most likely to be accessed segments of data while still allowing the storage device 417 to be placed in the minimum power consumption state.

Based on the identification of the storage devices to be placed in the minimum power consumption state, e.g., storage device 417 in this example, and the identification of one or more data segments 419 stored on the selected storage devices, hereafter storage device 417 for ease of explanation, that should be migrated to another tier of the tiered storage system 400, the storage system controller 415, either alone or in conjunction with the data segment location management engine 450, may initiate operations to migrate the identified one or more data segments 419 that are most likely to be accessed during the off-peak hours of operation to a higher tier storage device or devices. For example, the one or more data segments 419 may be migrated to one or more storage devices 418 in a highest tier 402 of the tiered storage system 400.

The size of the one or more data segments 419 that are migrated from the lower tiered storage devices, e.g., storage device 417, to the higher tier storage devices, e.g., storage device 419 in the highest tier 402, is preferably considerably smaller than the total number of data segments 419 stored in the one or more lower tier storage devices that are going to be placed in the minimal power consumption state. In addition, the amount of storage space required in the higher tier storage devices, e.g., storage device 418, for storing the one or more data segments, e.g., data segments 419, is considerably smaller than the total storage capacity of the higher tier storage devices. For example, a small portion of the storage capacity of the higher tier storage devices, e.g., 5%, may be utilized to store migrated data from lower tier storage devices for purposes of power consumption reduction. The amount of actual data migrated to this portion of the higher tier storage devices may be set to be at most, the amount of data that will fit within the apportioned amount of the higher tier storage devices. Thus, for example, if a higher tier storage device can store 1 TB of data, 500 GB may be set aside for use with migrated data due to power consumption reduction operations of the illustrative embodiments. Therefore, at most, 500 GB of data may be migrated from the lower tier storage devices, e.g., storage device 417, that are going to be placed into a minimal power consumption state to the higher tier storage devices, e.g., storage device 418.

With the migration of the data, the storage system controller 415 may update its routing tables to redirect access requests targeting data addresses that are stored on the selected lower tier storage devices 417 that are going to be placed in a minimal power consumption state. Thus, when the storage system controller 415 receives a read/write access request targeting an address corresponding to a selected lower tier storage device 417 that is in, or going to be in, a minimal power consumption state, the storage system controller 415 redirects the read/write access request to the migrated data in the higher tier storage device(s), e.g., storage device 418. Thus, read/write accesses to the data are serviced by the higher tier storage device(s) 418 using the migrated data 419 stored in the higher tier storage device(s) 418.

After migrating the selected data segments 419 to the higher tier storage device(s) 418, the selected lower tier storage device(s) 417 may be transitioned to a minimal power consumption state. For example, if the lower tier storage device(s) 417 are hard disk drive (HDD) storage devices, then these HDDs may be spun-down to either a state where the hard disks are no longer spinning or are spinning at a much slower rate, thereby conserving power by reducing power consumption of the storage device(s) 417. The higher tier storage device(s) 418 may be, for example, solid state drives (SSDs) which store the migrated data from the HDDs that are now spun-down. Read/Write requests are directed to the migrated data in the SSDs 418 during the period of off-peak utilization while the HDDs are in a spun-down minimal power consumption state.

While read/write requests are being routed to the migrated data in the higher tier storage device(s) 418, counters, such as may be provided in the counter data structure 440, may be used to determine how many read/write requests have been redirected to the migrated data in the higher tier storage device(s) 418. The counter value(s) may be compared, such as by the power consumption management engine 490, against one or more thresholds to determine whether the minimal power consumption state of the lower tier storage devices 417 should be exited. If the number of read/write requests redirected to the migrated data in the higher tier storage device(s) 418 meet or exceed these one or more thresholds, then the storage system controller 415, such as at the direction of the power consumption management engine 490, performs operations for spinning-up or otherwise returning the lower tier storage devices 417 that are in the minimal power consumption state, back to a normal power consumption state. Once this operation is completed and the lower tier storage devices 417 are again ready to handle read/write requests, the current state of the migrated data 419 in the higher tier storage device(s) 418 is migrated back to the lower tier storage devices 417.

In addition, or alternatively, the power consumption management engine 490 may look at the established schedule of off-peak, normal, and peak utilization as determined from the analysis of counter values, application integration, or other sources of information, to determine when to return the lower tier storage devices 417 to the normal power consumption state. For example, if the power consumption management engine 490 determines that the end of an off-peak period of utilization is eminent, then the power consumption management engine 490 may instruct the storage system controller 415 to begin performing operations to return the lower tier storage devices 417 to a normal power consumption state. Thus, in one illustrative embodiment, based on the schedule of off-peak, normal, and peak utilization, the power consumption management engine 490 initiates operations to migrate data between tiers of the storage system 400 as well as spin-down or spin-up the lower tier storage devices 417 to place them in, or return them from, a minimal power consumption state. The number of read/write accesses to the migrated data in the higher tier storage devices 418 may be used to supersede this schedule by exiting the minimal power consumption state early in the even that a sufficient number of read/write access requests is received to the migrated data in the higher tier storage devices 418 while the lower tier storage devices 417 are in the minimal power consumption state.

Thus, the illustrative embodiments provide a mechanism by which the residency of data segments within a tiered storage system may be automatically determined and dynamically modified so as to achieve optimum performance of the tiered storage system. The mechanisms of the illustrative embodiments monitor the access density, e.g., operations per second, associated with data segments, storage devices, and storage controllers to identify which data segments need to be moved from one tier to another within the tiered storage system and predict when to make such movements. Moreover, the mechanisms of the illustrative embodiments allow policies to be automatically generated for future movements of data segments based on detected usage patterns and cross segmentation relationships. As a result, an automated mechanism is provided for managing a tiered storage system that greatly reduces the need for manual intervention by a system administrator.

In addition, the illustrative embodiments provide mechanisms for performing power consumption reduction operations during off-peak hours of operation by placing storage devices in a minimal power consumption state while permitting accessibility to the most likely accessed segments of data from these storage devices by migrating the data to higher tier storage devices. As a result, read/write access requests directed to the most likely to be accessed segments of data are handled without incurring the performance costs of performing spin-up operations of the storage devices in the minimal power consumption state. Meanwhile, a large amount of power consumption is saved by placing the identified storage devices in the minimal power consumption state.

It should be appreciated that while the above illustrative embodiments are described as migrating data between tiers of a tiered storage system, the illustrative embodiments are not limited to such. Rather, in another illustrative embodiment, data may be migrated between storage devices on a same tier. For example, the data that is likely to be accessed during an off-peak time period may be migrated from a large number of storage devices, such as in a hard disk storage device tier of the tiered storage system, to a relatively small number of storage devices in the same tier to thereby consolidate the data into these few storage devices. In such an embodiment, the mechanisms of the present invention will keep the few storage devices having the consolidated high likelihood of access data completely powered on while the remaining storage devices in the tier can be put into the minimum power consumption state.

Figure 5:
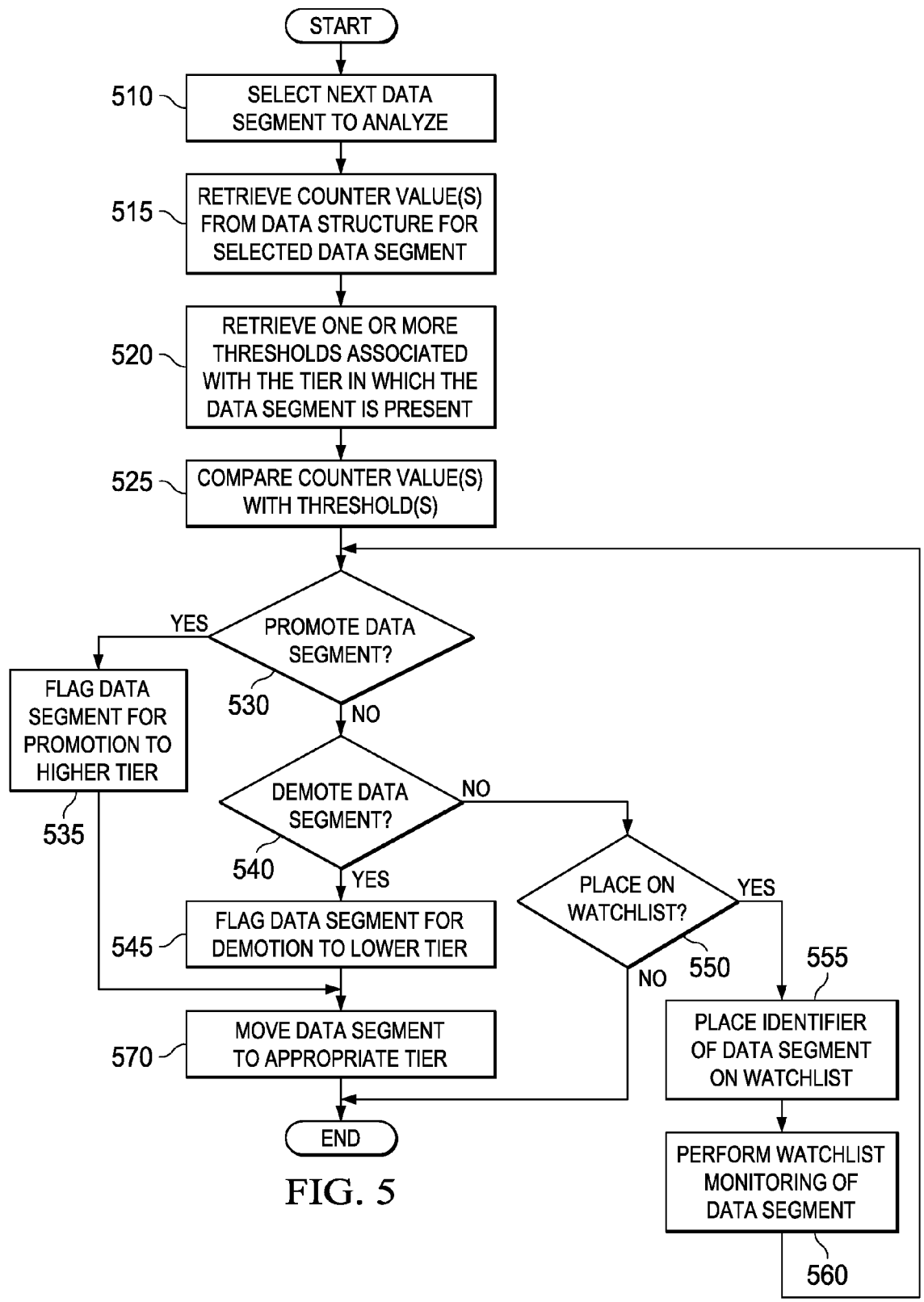
FIG. 5 is a flowchart outlining an operation for promoting/demoting a data segment within a tiered storage system based on access densities of the data segment.

FIG. 5 is a flowchart outlining an operation for promoting/demoting a data segment within a tiered storage system based on access densities of the data segment. The operation outlined in FIG. 5 may be performed, for example, by a data segment location management engine associated with a tiered storage system. The operation may be performed as a background operation such that the data segments of the tiered storage system may continue to be accessed while the data segment location management engine determines whether to promote/demote data segments and initiate movement of data segments between tiers of the tiered storage system. As such, the background operation may be performed in a continual manner, at periodic intervals, at the end of a monitoring period, or the like. The operation shown in FIG. 5 assumes that the operation is initiated by the occurrence of an event, such as initialization of the tiered storage system in the case of continual monitoring by the background operation, the elapse of the periodic interval, or the end of the monitoring period, for example.

As shown in FIG. 5, the operation starts by selecting a next data segment in the tiered storage system for analysis (step 510). One or more counter values for the data segment are retrieved from a counter value storage data structure (step 515). One or more threshold values for the tier in which the data segment currently resides are retrieved (step 520). The one or more counter values are then compared with the one or more thresholds (step 525). Based on the results of the comparison, a determination is made as to whether the data segment should be promoted to a higher tier in the tiered storage system (step 530). If so, then the data segment may be flagged, such as by setting a flag bit in metadata associated with the data segment, for promotion to a higher tier (step 535).

If the data segment is not to be promoted based on the results of the comparison in step 525, then a determination is made as to whether the data segment should be demoted based on the results of the comparison (step 540). If the results of the comparison indicate that the data segment should be demoted, then the data segment is flagged for demotion to a lower tier (step 545). If the results of the comparison do not indicate that the data segment should be demoted, a determination is made as to whether the data segment should be placed on a watch list (step 550). For example, this determination may involve determining whether the counter values are within a predetermined tolerance of the thresholds which is indicative of the data segment needing to be watched more closely for possible promotion/demotion.

If the data segment is to be placed on a watch list, an identifier of the data segment is added to a watch list (step 555) and watch list monitoring of the data segment 560 is performed (step 560). The watch list monitoring of the data segment may involve performing similar comparisons of counter values for subsequent time intervals to the thresholds on a more frequent basis to determine if promotion/demotion is in order, for example. Thus, the operation returns to step 530 where such promotion/demotion determinations are made bused on the comparisons performed as part of the watch list monitoring.

If the data segment is flagged for promotion (step 535) or demotion (step 545), at a later time the data segment may be moved to an appropriate tier of the tiered storage system. For example, the data segment may be moved to a next higher tier or next lower tier in the tiered storage system. Alternatively, the flags may identify a tier to which the data segment is to be moved such that data segments may be moved across multiple tiers, e.g., from a lowest tier to a highest tier. The actual movement of the data segments may be scheduled for a time of relatively low access requests being received for data in the tiered storage system, e.g., midnight, or for a time at which the particular data segment is determined to not have any pending access requests such that it may be moved without interfering with the availability of the data segment. Once the data segment is moved, or after a determination that the data segment is not to be promoted, demoted, or placed on a watch list, the operation terminates. The operation shown in FIG. 5 may be repeated for each data segment being monitored.

Figure 6:
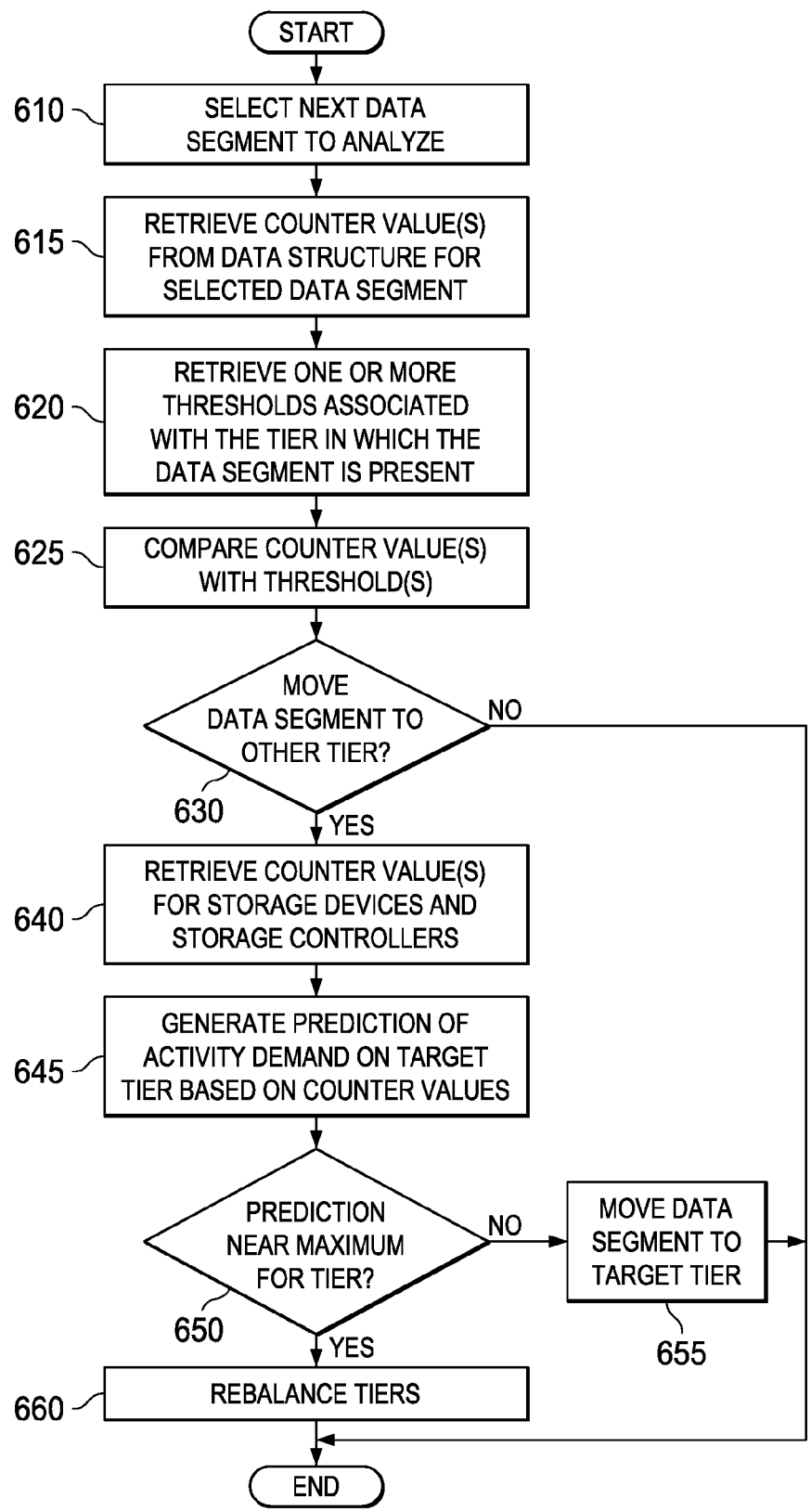
FIG. 6 is a flowchart outlining an operation for utilizing projected workloads to determine a proper location for a data segment within a tiered storage system in accordance with one illustrative embodiment.

FIG. 6 is a flowchart outlining an operation for utilizing projected workloads to determine a proper location for a data segment within a tiered storage system in accordance with one illustrative embodiment. As shown in FIG. 6, the operation starts by selecting a next data segment in the tiered storage system for analysis (step 610). One or more counter values for the data segment are retrieved from a counter value storage data structure (step 615). One or more threshold values for the tier in which the data segment currently resides are retrieved (step 620). The one or more counter values are then compared with the one or more thresholds (step 625). Based on the results of the comparison, a determination is made as to whether the data segment should be moved to another tier in the tiered storage system (step 630). If not, the operation terminates.

If so, then counter values for storage devices and storage controllers of the target tier, i.e. the tier to which the data segment is to be moved, are retrieved (step 640). A prediction of the activity demand on the target tier is generated based on the counter values associated with the data segment, the storage devices, and the storage controllers (step 645). A determination is made as to whether the prediction is near a maximum value for the tier, i.e. within a given tolerance of a maximum activity demand value for the tier (step 650). If not, then the data segment is moved to an appropriate storage device, i.e. one having sufficient available capacity and activity demand on both the storage device and its associated storage controller, in the target tier (step 655). If the prediction is near a maximum value, then a plurality of tiers in the tiered storage system undergo a rebalancing operation to rebalance the activity demands of the tiers such that the data segment may be moved to an appropriate tier (step 660). The operation then terminates. Again, this operation may be performed repeatedly for each data segment being monitored.

Figure 7:
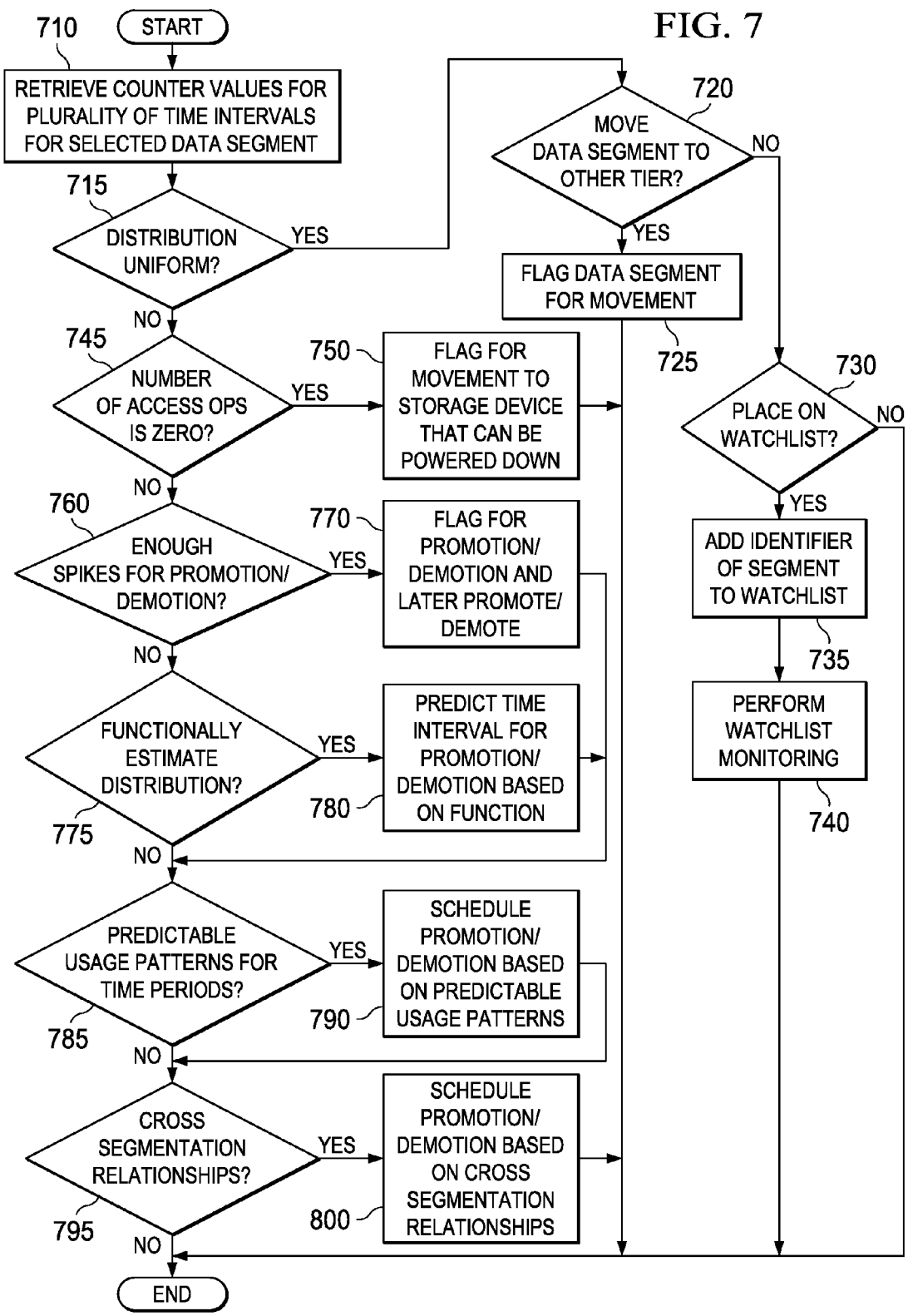
FIG. 7 is a flowchart outlining an operation for utilizing a searchable data structure to perform background analytical operations in accordance with one illustrative embodiment.

FIG. 7 is a flowchart outlining an operation for utilizing a searchable data structure to perform background analytical operations in accordance with one illustrative embodiment. As shown in FIG. 7, the operation starts by retrieving the counter values, from a searchable data structure such as the Btree discussed above, for a plurality of time intervals for a currently selected data segment (step 710). A determination is made as to whether a distribution of the counter values is uniform (step 715). If the distribution is uniform, a representation of the counter values, e.g., an average of the counter values, is compared to a retrieved threshold for the current tier to determine if the data segment should be moved to another tier (step 720). If the data segment is to be moved to another tier, then the data segment is flagged appropriately for promotion/demotion (step 725). If the data segment is not to be moved, then a determination is made as to whether the data segment should be placed on a watch list for possible promotion/demotion (step 730). If the data segment is to be placed on a watch list, an identifier of the data segment is added to a watch list (step 735) and watch list monitoring of the data segment is performed in a similar manner as discussed above with regard to FIG. 5 (step 740).

If the distribution of the counter values is not uniform, a determination is made as to whether the number of access operations during the plurality of time intervals is zero (step 745). If so, the data segment is flagged for movement to a storage device that can be powered down over long periods of time (step 750). If the number of access is not zero, a determination is made as to whether the distribution has enough spikes either above or below a threshold for the tier to promote/demote the data segment (step 760). If so, the data segment is flagged for promotion/demotion and later promoted/demoted to an appropriate tier in the tiered storage system, depending upon whether the spikes are above or below the threshold (step 770).

If the data segment does not have enough spikes for promotion/demotion, a determination is made as to whether the distribution may be functionally estimated, e.g., by way of a linear increasing/decreasing slope, exponentially increasing/decreasing curve, or the like (step 775). If so, functional representation is used to predict a time interval at which the count value will meet/exceed/fall below the threshold and promotion/demotion of the data segment is scheduled based on the predicted time interval (step 780).

Thereafter, a determination is made as to whether the distribution has usage patterns indicative of predictable time periods at which the data segment should be promoted/demoted (step 785). If so, the promotion/demotion of the data segment is scheduled based on the usage pattern of predictable time periods (step 790). A determination is also made as to whether there are predictable cross segmentation relationships between the data segment and one or more other data segments (step 795). If so, the promotion/demotion of the data segment is scheduled based on these identified cross segmentation relationships (step 800). The operation then terminates.

Figure 8:
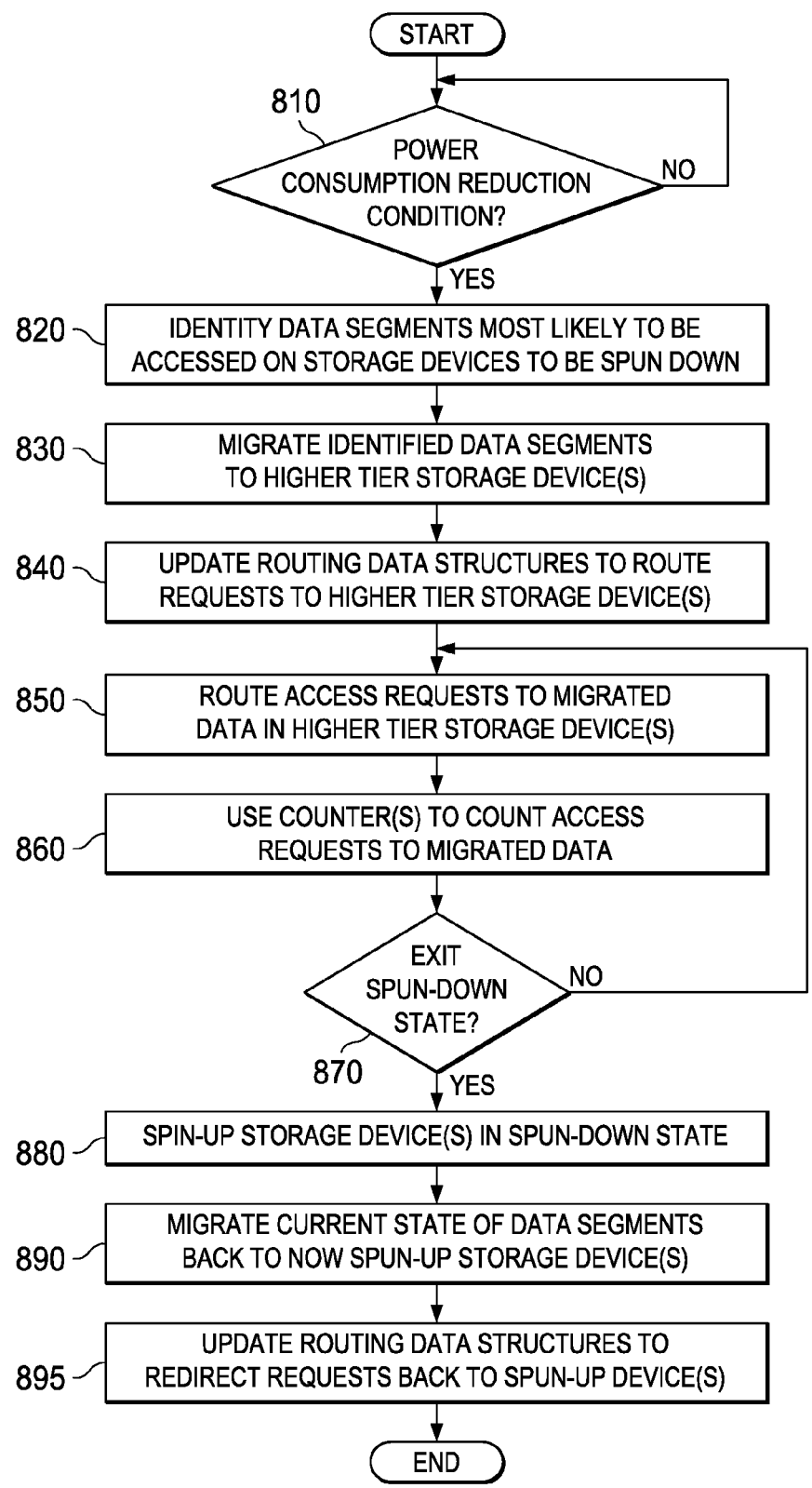
FIG. 8 is a flowchart outlining an example operation for performing power consumption management in accordance with one illustrative embodiment.

FIG. 8 is a flowchart outlining an example operation for performing power consumption management in accordance with one illustrative embodiment. As shown in FIG. 8, the operation starts by determining if a condition exists for placing one or more lower tier storage devices into a minimal power consumption state (step 810). For example, as discussed above, this condition may be a determined schedule of peak, normal, and off-peak time periods, with the condition being the entering, or eminent entering, into an off-peak time period. This may take into account, as well, application information obtained from application integration to determine if application operations and configurations may override entry into the minimal power consumption state.

If such a condition does not exist, then the operation continues to monitor for such a condition by loop back to step 810. If a condition exists for placement of one or more lower tier storage devices into a minimal power consumption state, a determination of the most likely to be accessed segments of data is performed (step 820). The identified most likely to be accessed segments of data are migrated to a higher tier storage device (step 830) and routing data structures are update to route access requests to the migrated data in the higher tier storage device (step 840).

Access requests are redirected to the migrated data in the higher tier storage device (step 850) and one or more counter values for counting a number of access requests redirected to the migrated data are incremented in response to the redirection of such requests (step 860).

A determination is made as to whether a condition exists for exiting the minimal power consumption state (step 870). This condition may include, for example, a schedule of peak, normal, and off-peak time periods, where the condition is the exiting, or eminent exiting, of an off-peak time period in the schedule. Furthermore, the condition may include determining if the one or more counter values for counting the number of redirected access requests meets or exceeds one or more threshold values.

If a condition for exiting the minimal power consumption state has not occurred, the operation returns to step 850 and continues in the minimal power consumption state. If a condition for exiting the minimal power consumption state has occurred, then the lower tier storage device in the minimal power consumption state is returned to a normal power consumption state (step 880). The current state of the migrated data in the higher tier storage device is then migrated to the lower tier storage device (step 890) and the routing data structures are updated to redirect access requests back to the lower tier storage device (step 895). The operation then terminates.

While the above illustrative embodiments utilize a plurality of counters associated with each data segment, e.g., one for each time interval, the illustrative embodiments are not limited to such. Rather, the use of the plurality of counters facilitates a greater range and more complex analysis using trends, predictions, and the like. In other illustrative embodiments, a single counter can be used with each segment, the counter being stored in a data structure in a similar manner as described above. This single counter may be used to generate a weighted access rate that is biased toward recent activity on the data segment. In addition, a weighted access rate for a previous time interval may be maintained in this data structure associated with the data segment for use in determining a weighted access rate for the current time interval.

For example, a data segment may have a single counter that provides a count indicative of an access rate for the current time interval, e.g., the most recent 30 minutes. The weighted access rate for a previous time interval may be combined, through a pre-determined function or operation, with the counter value to determine a current weighted access rate for the current time interval. This current weighted access rate may then be compared to one or more pre-established thresholds to determine whether the data segment is to be promoted, demoted, or left in the current tier of the storage system.

As one example, the weighted access rate may be determined by a function such as $Anew=W*I+(1-W)*A$, where Anew is the current weighted access rate for the current time interval, I is the counter value for the current time interval, W is a predetermined weighting factor (e.g., 0.75 or the like), and A is the weighted access rate from the previous time interval. Thus, for example, if W is 0.75, then $Anew=0.75\ I+0.25\ A$. Of course other functions or operations for determining a weighted access rate for the current time interval can be used without departing from the spirit and scope of the illustrative embodiments. For example, instead of using the weighted access rate for a previous time interval (A), an average of the weighted access rates for a predetermined number of previous time intervals may be used, a maximum weighted access rate from a predetermined number of previous time intervals may be used, or any other measure of access rates for this data segment may be used instead of the weighted access rate for the previous time interval (A). Moreover, other combinations of counter values, access rate values, and weighting functions may be used without departing from the spirit and scope of the illustrative embodiments.

In other illustrative embodiments, the data structures storing the counter value(s) for the data segments may store additional information to aid in performing more complex analysis. For example, the data structures may store information in appropriate fields to identify if a particular data segment is locked to a given tier, if there is a manual movement policy to follow for the associated data segment, how many times the data segment has been moved in a predetermined time period, the access rate of the data segment when it was last in the highest tier of the storage system, a first timestamp reference for when the data segment was first accessed, a number of times the data segment has been accessed since the first time stamp, and the like. Such information permits more complex analysis, such as determining if a data segment, which otherwise would be moved based on the operations described above, should remain in a current tier of the storage system because the data segment has been locked to the tier, has a manual movement policy associated with it, or has been moved more than a predetermined number of times within a predetermined time period of the current time. Moreover, such analysis may involve looking at the access rate for the data segment when it was last in the highest tier, and determining if that access rate does not meet a predetermined criteria. In such a case, the data segment is moved to a next lower tier or is not moved at all. Other more detailed and complex analysis may be performed using such information stored in the data structures associated with the data segments without departing from the spirit and scope of the illustrative embodiments.

With regard to the power consumption management operations of the illustrative embodiments, various modifications to the example illustrative embodiments set forth above may be made without departing from the spirit and scope of the illustrative embodiments. For example, as noted above, rather than migrating data between tiers of a tiered storage device, data may be migrated from a larger set of storage devices to a smaller set of storage devices within the same tier. This would allow, for example, spinning down a larger number of hard disk storage devices while keeping only a small number of storage devices holding the consolidated data that is likely to be accessed during the off-peak hours in a powered state.

In another illustrative embodiment, the methodology for identifying the data segments which are likely to be accessed can be based on heuristics as described above or it can be based on administrator defined rules. For example, administrator defined rules may specify which data segments that different geographic locations of an enterprise access and the different times, based on their working hours, that the data segments are accessed. Other administrator defined rules may specify when backup and archiving applications run and what data segments are accessed by such backup and archiving applications. In this way, one can determine which data segments are likely to be accessed and in what time periods so that appropriate migration of data and powering-down of storage devices in accordance with the illustrative embodiments may be performed.

In addition, the illustrative embodiments may be implemented in a cloud computing system in which elements of the illustrative embodiments may be provided on various computing devices coupled to each other via one or more networks and may be provided in terms of cloud services as described hereafter.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
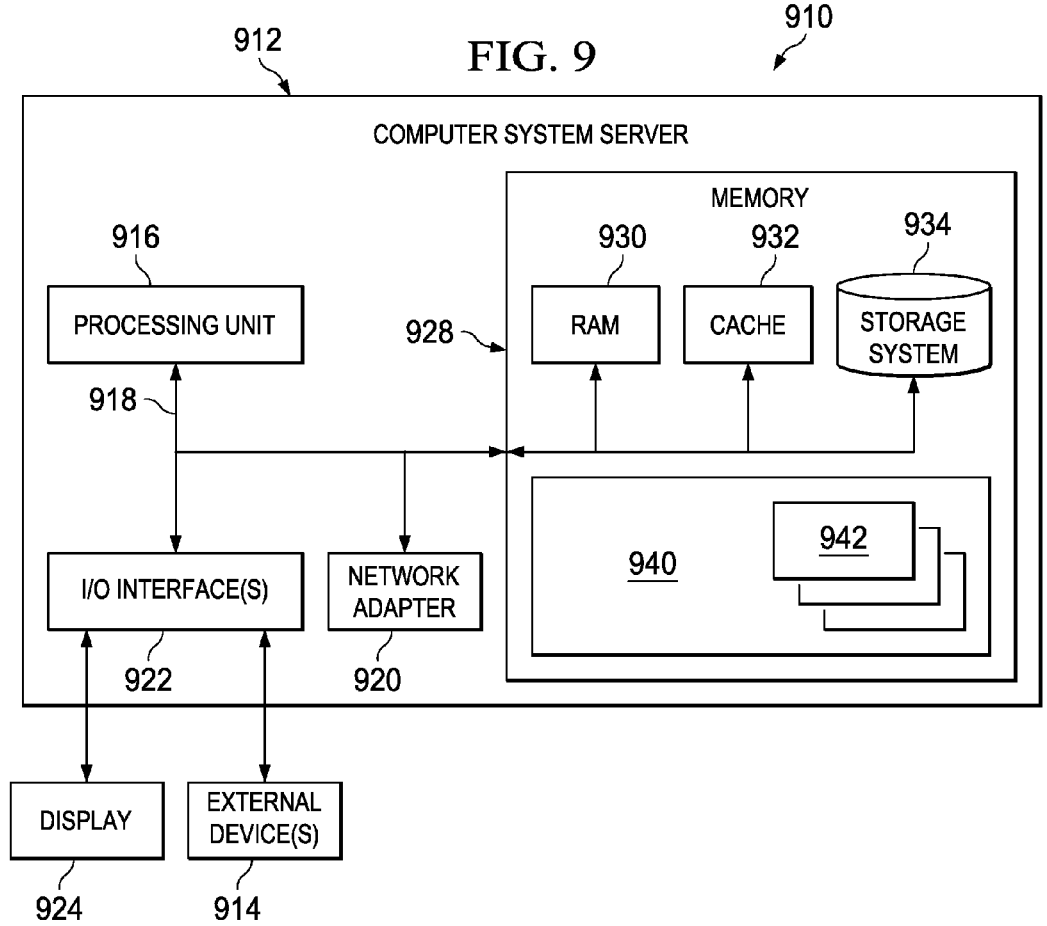
FIG. 9 depicts a cloud computing node according to an illustrative embodiment.

Referring now to FIG. 9, a schematic of an example of a cloud computing node is shown. Cloud computing node 910 is only one example of a suitable cloud computing node and is not intended to suggest any limitation as to the scope of use or functionality of embodiments of the invention described herein. Regardless, cloud computing node 910 is capable of being implemented and/or performing any of the functionality set forth hereinabove.

In cloud computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 30 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not Limited to: microcode, device drivers, redundant processing units, external disk drive arrays, RAID systems, tape drives, and data archival storage systems, etc.

Figure 10:
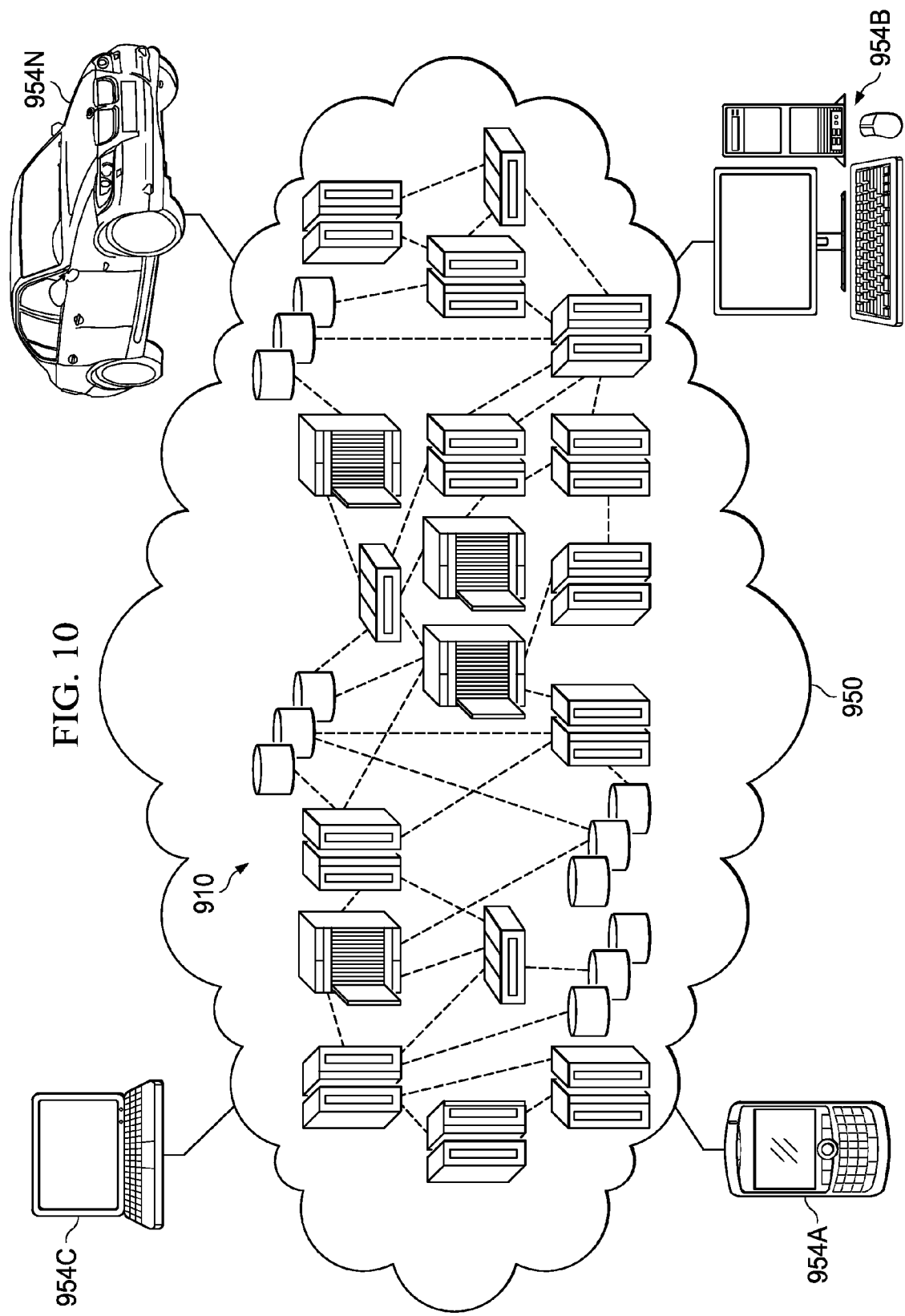
FIG. 10 depicts a cloud computing environment according an illustrative embodiment.

Referring now to FIG. 10, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 954A-N shown in FIG. 10 are intended to be illustrative only and that computing nodes 910 and cloud computing environment 950 can communicate with any type of computerized device over any type of network and/or network addressable connection (e.g., using a web browser).

Figure 11:
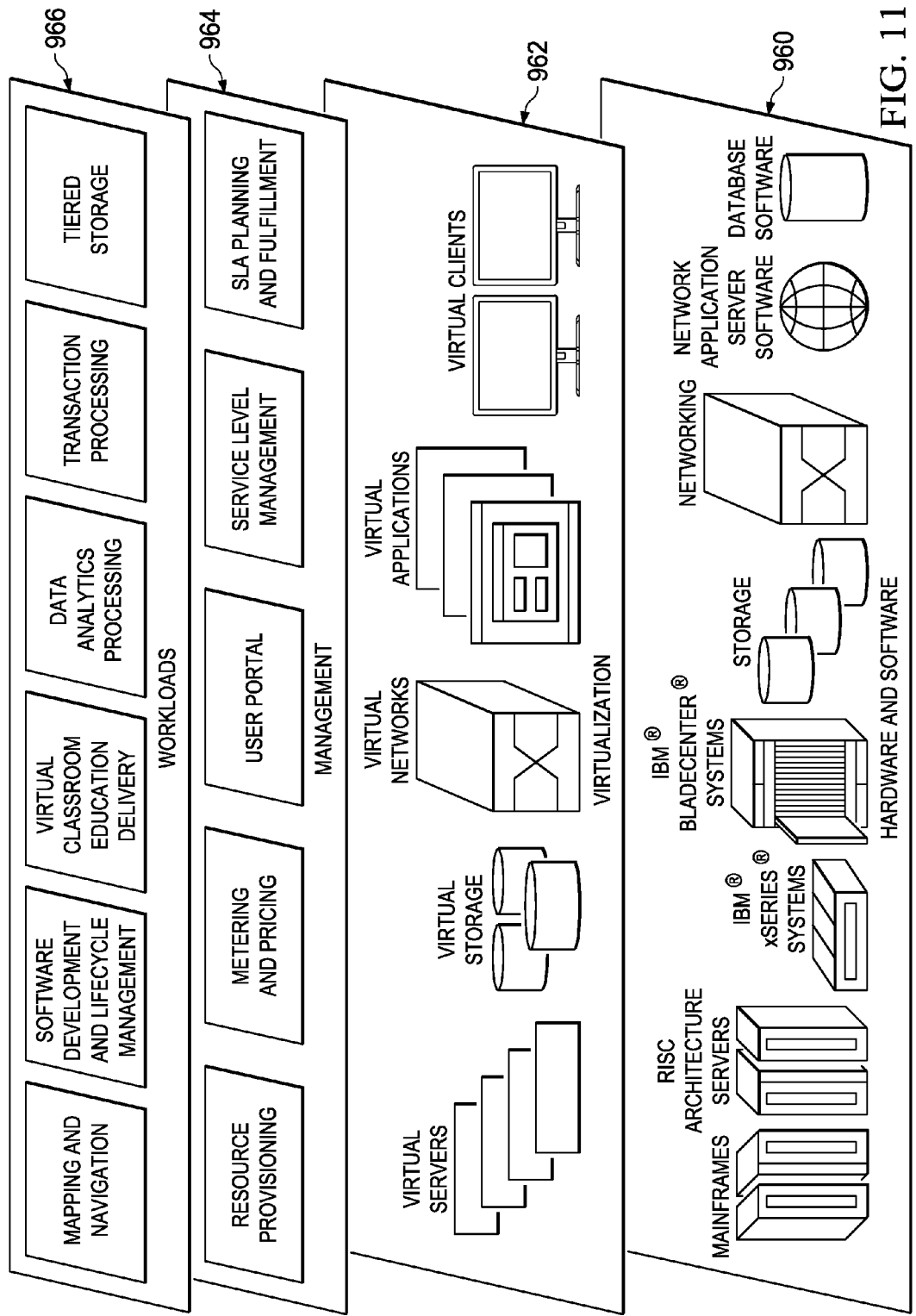
FIG. 11 depicts abstraction model layers according to an illustrative embodiment.

Referring now to FIG. 11, a set of functional abstraction layers provided by cloud computing environment 950 (FIG. 10) is shown. It should be understood in advance that the components, layers, and functions shown in FIG. 11 are intended to be illustrative only and embodiments of the invention are not limited thereto. As depicted, the following layers and corresponding functions are provided.

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and tiered storage with power control utilizing the data migration and power-down or spin-down mechanisms of one or more of the illustrative embodiments described above.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing data segments in a tiered storage system, comprising:
   recording first usage pattern information for storage devices in a first tier of the tiered storage system using a counter with a first set of counters for each given storage device that measures an operations per second rate for the entire given storage device;
   recording second usage pattern information for data segments in the storage devices using a second set of counters that measure an operations per second rate the data segments;
   analyzing the recorded first usage pattern information and the recorded second usage pattern information for a period of time of off-peak utilization of the tiered storage system;
   identifying, based on results of the analysis of the recorded first usage pattern information for the period of time of off-peak utilization of the tiered storage system, one or more first storage devices in the first tier of the tiered storage system that are accessed during the period of time of off-peak utilization of the tiered storage system at an operations per second rate lower than a cold storage device threshold and may be placed in a minimal power consumption state;
   identifying, based on results of the analysis of the recorded second usage pattern information for the period of time of off-peak utilization of the tiered storage system, one or more data segments stored on the identified one or more first storage devices that are most likely to be accessed during a period of time in which the one or more first storage devices are in the minimal power consumption state;
   migrating the one or more data segments to one or more second storage devices in one of the first tier or a second tier of the storage system; and
   placing the one or more first storage devices in the minimal power consumption state, wherein access requests to the one or more data segments are serviced by the one or more second storage devices while the one or more first storage devices are in the minimal power consumption state.

2. The method of claim 1, wherein the one or more first storage devices are rotating disk based storage devices, and wherein the one or more second storage devices are non-rotating disk based storage devices.

3. The method of claim 2, wherein the one or more second storage devices are solid state drives.

4. The method of claim 1, wherein the first tier is a lower tier in the tiered storage system than the second tier, and wherein migrating the one or more data segments to the one or more second storage devices comprises migrating the one or more data segments from the one or more first storage devices in the first tier to the one or more second storage devices in the second tier.

5. The method of claim 1, wherein a total number of storage devices in the one or more second storage devices is less than a total number of storage devices in the one or more first storage devices.

6. The method of claim 1, wherein identifying the one or more first storage devices in the first tier of the tiered storage system that may be placed in a minimal power consumption state comprises:
   providing application integration for analyzing operations of at least one application to determine which storage devices and data segments within storage devices are targeted by operations of the at least one application; and
   identifying the one or more first storage devices based on a determination as to which storage devices are targeted by operations of the at least one application as identified by the application integration.

7. The method of claim 6, wherein the at least one application is a data backup application.

8. The method of claim 1, wherein identifying the one or more data segments stored on the one or more first storage devices that are most likely to be accessed during the period of time in which the one or more first storage devices are in the minimal power consumption state comprises:
   associating a counter within the second set of counters with each data segment in the one or more first storage devices;
   incrementing, over the period of time of off-peak utilization of the tiered storage system, the counters associated with the data segments in the one or more first storage devices in response to accesses to data segments corresponding to the counters;
   comparing values of the counters associated with the data segments in the one or more first storage devices to a hot spot threshold; and
   identifying the one or more data segments as data segments having corresponding counter values that meet or exceed the hot spot threshold.

9. The method of claim 1, further comprising:
   determining whether a number of accesses to the one or more data segments, during the period of time that the one or more first storage devices are in the minimal power consumption state, and which have been migrated to the one or more second storage devices, meet or exceed a predetermined threshold; and
   in response to the number of accesses to the one or more data segments meeting or exceeding the predetermined threshold, returning the one or more first storage devices to a normal power consumption state and migrating the one or more data segments back to the one or more first storage devices from the one or more second storage devices.

10. The method of claim 1, wherein the data processing system is a cloud computing system in which the method is implemented as a service provided by the cloud computing system.

11. The method of claim 1, wherein the first tier is a lower tier in the tiered storage system than the second tier, and wherein migrating the one or more data segments to the one or more second storage devices comprises migrating the one or more data segments from the one or more first storage devices in the first tier to the one or more second storage devices in the first tier.

12. A computer program product comprising a non-transitory computer storage medium having a computer readable program stored thereon, wherein the computer readable program, when executed on a data processing system, causes the data processing system to:
   record first usage pattern information for storage devices in a first tier of the tiered storage system using a counter with a first set of counters for each given storage device that measures an operations per second rate for the entire given storage device;
   record second usage pattern information for data segments in the storage devices using a second set of counters that measure an operations per second rate the data segments;
   analyze the recorded first usage pattern information and the recorded second usage pattern information for a period of time of off-peak utilization of the tiered storage system;
   identify, based on results of the analysis of the recorded first usage pattern information for the period of time of off-peak utilization of the tiered storage system, one or more first storage devices in the first tier of the tiered storage system that are accessed during the period of time of off-peak utilization of the tiered storage system at an operations per second rate lower than a cold storage device threshold and may be placed in a minimal power consumption state;
   identify, based on results of the analysis of the recorded second usage pattern information for the period of time of off-peak utilization of the tiered storage system, one or more data segments stored on the identified one or more first storage devices that are most likely to be accessed during a period of time in which the one or more first storage devices are in the minimal power consumption state;
   migrate the one or more data segments to one or more second storage devices in one of the first tier or a second tier of the storage system; and
   place the one or more first storage devices in the minimal power consumption state, wherein access requests to the one or more data segments are serviced by the one or more second storage devices while the one or more first storage devices are in the minimal power consumption state.

13. The computer program product of claim 12, wherein the one or more first storage devices are rotating disk based storage devices, and wherein the one or more second storage devices are non-rotating disk based storage devices.

14. The computer program product of claim 13, wherein the one or more second storage devices are solid state drives.

15. The computer program product of claim 12, wherein the first tier is a lower tier in the tiered storage system than the second tier, and wherein migrating the one or more data segments to the one or more second storage devices comprises migrating the one or more data segments from the one or more first storage devices in the first tier to the one or more second storage devices in the second tier.

16. The computer program product of claim 12, wherein a total number of storage devices in the one or more second storage devices is less than a total number of storage devices in the one or more first storage devices.

17. The computer program product of claim 12, wherein the computer readable program causes the data processing system to identify the one or more first storage devices in the first tier of the tiered storage system that may be placed in the minimal power consumption state by:
   providing application integration for analyzing operations of at least one application to determine which storage devices and data segments within storage devices are targeted by operations of the at least one application; and
   identifying the one or more first storage devices based on a determination as to which storage devices are targeted by operations of the at least one application as identified by the application integration.

18. The computer program product of claim 17, wherein the at least one application is a data backup application.

19. The computer program product of claim 12, wherein the computer readable program causes the data processing system to identify the one or more data segments stored on the one or more first storage devices that are most likely to be accessed during the period of time in which the one or more first storage devices are in the minimal power consumption state by:
   associating a counter within the second set of counters with each data segment in the one or more first storage devices;

incrementing, over the period of time of off-peak utilization of the tiered storage system, the counters associated with the data segments in the one or more first storage devices in response to accesses to data segments corresponding to the counters;

comparing values of the counters associated with the data segments in the one or more first storage devices to a hot spot threshold; and identifying the one or more data segments as data segments having corresponding counter values that meet or exceed the hot spot threshold.

20. The computer program product of claim 12, wherein the computer readable program further causes the data processing system to:

determine whether a number of accesses to the one or more data segments, during the period of time that the one or more first storage devices are in the minimal power consumption state, and which have been migrated to the one or more second storage devices, meet or exceed a predetermined threshold; and in response to the number of accesses to the one or more data segments meeting or exceeding the predetermined threshold, return the one or more first storage devices to a normal power consumption state and migrating the one or more data segments back to the one or more first storage devices from the one or more second storage devices.

21. The computer program product of claim 12, wherein the data processing system is a cloud computing system in which the computer readable program is implemented as a service provided by the cloud computing system.

22. A tiered storage system, comprising:

a plurality of storage devices; and a data processing system coupled to the plurality of storage devices, wherein the data processing system is configured to:

record first usage pattern information for storage devices in a first tier of the tiered storage system using a counter with a first set of counters for each given storage device that measures an operations per second rate for the entire given storage device;

record second usage pattern information for data segments in the storage devices using a second set of counters that measure an operations per second rate the data segments;

analyze the recorded first usage pattern information and the recorded second usage pattern information for a period of time of off-peak utilization of the tiered storage system;

identify, based on results of the analysis of the recorded first usage pattern information for the period of time of off-peak utilization of the tiered storage system, one or more first storage devices, of the plurality of storage devices, in the first tier of the tiered storage system that are accessed during the period of time of off-peak utilization of the tiered storage system at an operations per second rate lower than a cold storage device threshold and may be placed in a minimal power consumption state;

identify, based on results of the analysis of the recorded second usage pattern information for the period of time of off-peak utilization of the tiered storage system, one or more data segments stored on the one or more first storage devices that are most likely to be accessed during a period of time in which the one or more first storage devices are in the minimal power consumption state;

migrate the one or more data segments to one or more second storage devices, in the plurality of storage devices, in one of the first tier or a second tier of the storage system; and place the one or more first storage devices in the minimal power consumption state, wherein access requests to the one or more data segments are serviced by the one or more second storage devices while the one or more first storage devices are in the minimal power consumption state.

23. The tiered storage system of claim 22, wherein identifying one or more data segments stored on the one or more first storage devices that are most likely to be accessed during a period of time in which the one or more first storage devices are in the minimal power consumption state comprises:

associating a counter with each data segment in the one or more first storage devices;

incrementing, over the period of time of off-peak utilization of the tiered storage system, the counters associated with the data segments in response to accesses to data segments corresponding to the counters;

comparing values of the counters associated with the data segments to a hot spot threshold; and identifying the one or more data segments as data segments having corresponding counter values that meet or exceed the hot spot threshold.

\* \* \* \* \*